(12) United States Patent
Suzuki et al.

(10) Patent No.: US 6,594,223 B2
(45) Date of Patent: Jul. 15, 2003

(54) LENS DRIVING APPARATUS FOR DISK PLAYER HAVING A LENS HOLDER SUPPORTED BY A PLURALITY OF ELASTIC MEMBERS HAVING DIFFERENT SPRING CONSTANTS

(75) Inventors: Jun Suzuki, Tokorozawa (JP); Katsumi Ishii, Tokorozawa (JP); Eiji Kuroki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/779,874

(22) Filed: Feb. 8, 2001

(65) Prior Publication Data

US 2001/0019519 A1 Sep. 6, 2001

(30) Foreign Application Priority Data

Feb. 9, 2000 (JP) ........................................ 2000-032505

(51) Int. Cl.⁷ ............................................... G11B 7/095
(52) U.S. Cl. ..................... 369/219; 369/253; 369/44.16; 359/814; 359/824
(58) Field of Search ............................ 369/44.16, 219, 369/253, 224; 359/811, 813, 819, 824, 814

(56) References Cited

U.S. PATENT DOCUMENTS

| 5,467,328 | A | * | 11/1995 | Murakami et al. | 369/44.16 |
|---|---|---|---|---|---|
| 5,488,603 | A | * | 1/1996 | Tomita et al. | 369/219 |
| 5,715,231 | A | * | 2/1998 | Nagasato et al. | 369/247 |
| 6,342,978 | B1 | * | 1/2002 | Nishikawa et al. | 359/813 |

FOREIGN PATENT DOCUMENTS

| JP | 9-219031 | * | 8/1997 |
|---|---|---|---|
| JP | 11-66583 | * | 3/1999 |
| JP | 11-203698 | * | 5/1999 |
| JP | 2000-242944 | * | 9/2000 |

OTHER PUBLICATIONS

Abstract of JP 61 289541.

* cited by examiner

Primary Examiner—Aristotelis M. Psitos
(74) Attorney, Agent, or Firm—Perman & Green, LLP

(57) ABSTRACT

A lens driving apparatus for a disk player capable of easily approaching to the innermost circumference of a disk and realizing a reduction in size and weight thereof, in which: an actuator section where a movable portion including printed board coils fixed to the respective side surfaces of a lens holder containing an objective lens is movably supported by outer circumferential side wire-form elastic members and inner circumferential side wire-form elastic members fixed to an actuator base, and a suspension base including a pair of yokes to which a pair of magnets disposed so as to be opposed to each other with a predetermined magnetic space therebetween are fixed and standing portions are included; and a width Wi of each of the inner circumferential side wire-form elastic members is set to be greater than a width Wo of each of the outer circumferential side wire-form elastic members.

4 Claims, 20 Drawing Sheets

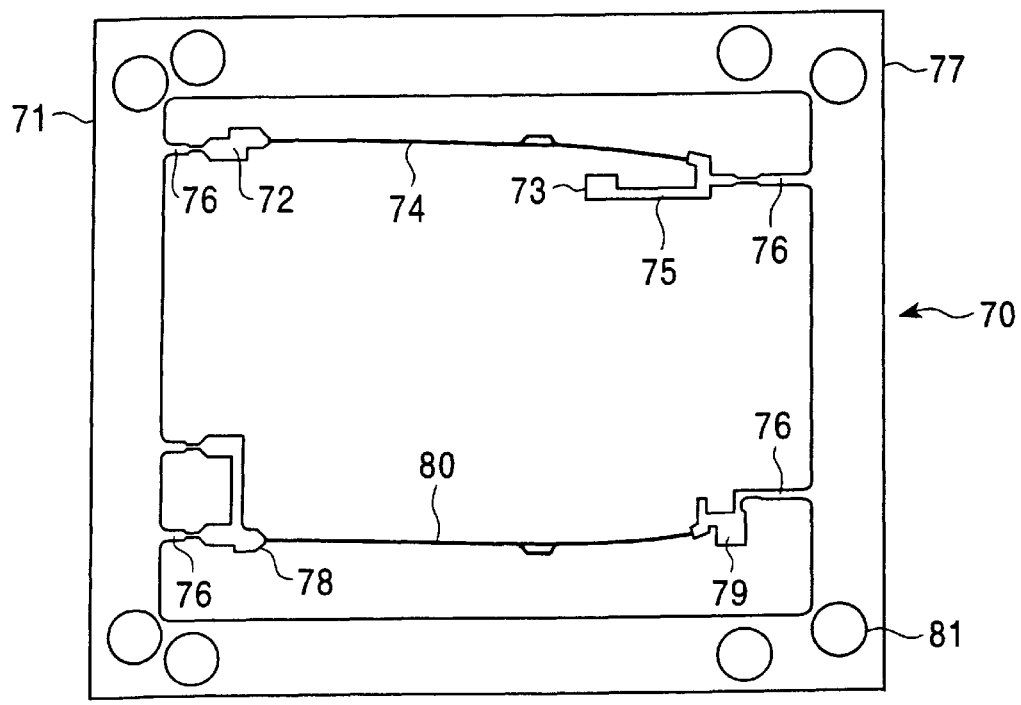
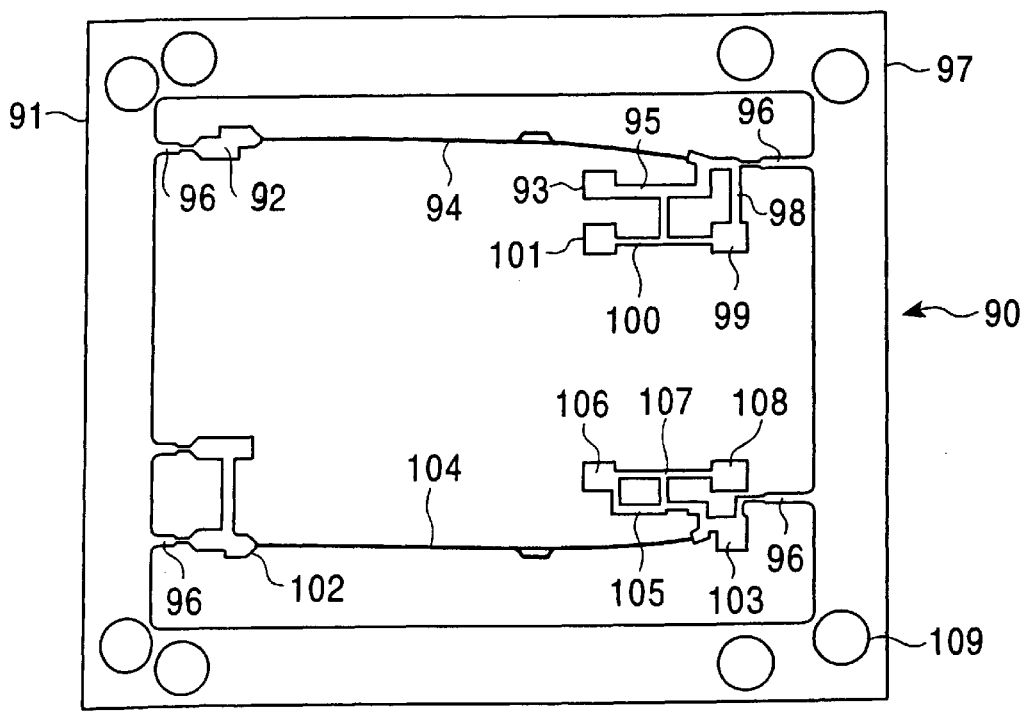

LENS DRIVING APPARATUS FOR DISK PLAYER HAVING A LENS HOLDER SUPPORTED BY A PLURALITY OF ELASTIC MEMBERS HAVING DIFFERENT SPRING CONSTANTS

BACKGROUND OF THE INVENTION

1. Field of the Invention

The present invention relates to a lens driving apparatus for a disk player which optically writes/reads information to/from a disk-shaped recording medium such as a compact disk or an optical disk.

2. Description of Related Art

Conventionally, a lens driving apparatus 1 for a disk player for reproducing information recorded on an optical disk such as a CD or a DVD has been known. In order to read information recorded on an optical disk accurately, the lens driving apparatus 1 for a disk player performs a focus control for controlling a distance between an information recorded surface of the optical disk and an objective lens with respect to warping or deflection of the optical disk, and a tracking control for follow-up controlling the objective lens with respect to the eccentricity of an information track of the optical disk. The structure of the lens driving apparatus 1 for a disk player will be described with reference to FIG. 1.

A pick-up device 1 comprises: a plate-shaped actuator base 4 including yokes 3 provided so as to be opposed to each other to which a pair of magnets 2 are fixed respectively; a movable portion 7 which is movably supported, via four supporting wires 6a–6d, by a supporting base 5 which is fixed to a side surface of the actuator base 4 by, e.g., a screw (not shown); a box-shaped actuator cover 14 for protecting the movable portion 7, which is made of a metal plate or a resin and which includes an opening hole 14A for an objective lens 8 in a top portion thereof; and a pick-up body (not shown) for containing optical components such as a light source, a collimator lens, and a beam splitter. The movable portion 7 comprises: a lens holder 10 containing the objective lens 8 and having four fixed arms 9 which protrude in tracking directions; a focus coil 11 wound around the body of the lens holder 10; and four D-shaped tracking coils 12 which are fixed to the respective side surfaces of the lens holder 10 respectively opposing to the magnets 2. The movable portion 7 is supported to be movable with respect to the actuator base 4 by providing the four fixed arms 9 of the lens holder 10 in the supporting base 5 and fixing the four fixed arms 9 to the four supporting wires 6a–6d.

The four supporting wires 6a–6d are used to movably support the movable portion 7 and used also as a connecting line for supplying a driving current to the focus coil 11 and the four tracking coils 12. Therefore, each of the four supporting wires 6a–6d is made of an elastic member with a high conductivity.

One end of the focus coil 11 wound around the body of the lens holder 10 is connected to, for example, the supporting wire 6a, and the other end of the focus coil 11 is connected to the supporting wire 6b. Thus, by supplying a focus driving current to the two supporting wires 6a and 6b of the supporting base 5, the movable portion 7 is driven in a focus direction.

The four tracking coils 12 which are fixed to the respective side surfaces of the lens holder 10 are serially connected by using the two supporting wires 6c and 6d and a wiring member 13. More specifically, one supporting wire 6c is connected to a line end of one of the two tracking coils 12 which are fixed to one side surface of the lens holder 10 and which are serially connected with each other, and the other supporting wire 6d is connected to a line end of one of the two tracking coils 12 which are fixed to the other side surface of the lens holder 10 and which are serially connected with each other. The line ends of the other tracking coils 12 are connected with each other by the wiring member 13. Thus, the four tracking coils 12 are serially connected with respect to the two supporting wires 6c and 6d. Therefore, by supplying a tracking driving current to the two supporting wires 6c and 6d, the movable portion 7 is driven in a tracking direction.

The movable portion 7 of the pick-up device 1 is movably supported by the four supporting wires 6 as described above. Therefore, when the movable portion 7 receives a strong vibration, for example, it may move by a large distance in a focus direction, so that the objective lens 9 hits the information recorded surface of the optical disk, thereby scratching the information recorded surface. Thus, the pick-up device 1 regulates a movement in a focus direction generally by providing the actuator cover 14.

In recent years, along with the spread of high double-speed reproduction in an optical disk driving apparatus, there has been an increased need for a higher driving force of a spindle motor, i.e., an increase in the size of the spindle motor. As illustrated in FIGS. 2A and 2B, the optical disk driving apparatus comprises a turntable 16 axially supported on a spindle motor 15, and a conveying mechanism 18 for moving the pick-up device 1 in a radial direction (a direction indicated by K in the figure) of an optical disk 17. The conveying mechanism 18 comprises: a shaft 20 for slidably supporting a pick-up body 19 on which the lens driving apparatus 1 for a disk player is mounted in the radial direction of the optical disk 17; a rack 21 axially supported on the shaft 20; and a transmission gear 22 axially supported on a thread motor (not shown). In the pick-up body 19 on which the pick-up device 1 is mounted, the transmission gear 22 rotates along with the rotation of the thread motor, and the rotation of the transmission gear 22 is transmitted to the rack 21. Along with the rotation of the shaft 20, the pick-up body 19 moves in the radial direction of the optical disk 17.

The pick-up body 19 on which the pick-up device 1 is mounted is conveyed in an inner circumferential direction of the optical disk 17 by the conveying mechanism 18. However, as shown in FIG. 2B, the pick-up body 19 cannot move beyond a position where it contacts the spindle motor 15. On the other hand, the pick-up device 1 cannot move beyond a position where the actuator cover 14 contacts the turntable 16. As described above, along with the spread of high double-speed reproduction in an optical disk driving apparatus, the spindle motor has been required to have a higher driving force, and the size thereof has been increasing. As a result, such an extra space that the pick-up device can approach below the turntable is diminished, thereby making it difficult to read the innermost circumference of a disk.

OBJECT AND SUMMARY OF THE INVENTION

The present invention has been made in view of the above-described problem, and an object thereof is to provide a lens driving apparatus for a disk player, which can easily approach to the innermost circumference of a disk and which can realize a reduction in size and weight thereof.

In order to solve the above-described problem, a lens driving apparatus for a disk player according to the first aspect of the present invention has such a structure that a lens holder including an objective lens, focus coils, and tracking coils fixed thereto is supported by a plurality of cantilevered wire-form elastic members, and drives the lens holder in focus and tracking directions. The wire-form elastic members include inner circumferential side wire-form elastic members and outer circumferential side wire-form elastic members which are disposed to be apart from each other in the tracking direction so as to interpose therebetween a point of application of a focus driving force generated from the focus coils. The inner circumferential side wire-form elastic members and the outer circumferential side wire-form elastic members have respectively different spring constants when deflected in the focus direction, and have respectively different distances to the point of application in the tracking direction.

A lens driving apparatus for a disk player according to the second aspect of the present invention is the lens driving apparatus for a disk player according to the first aspect of the present invention in which the spring constant of the inner circumferential side wire-form elastic members is greater than the spring constant of the outer circumferential side wire-form elastic members, and the distance from the inner circumferential side wire-form elastic members to the point of application is smaller than the distance from the outer circumferential side wire-form elastic members to the point of application.

A lens driving apparatus for a disk player according to the third aspect of the present invention is the lens driving apparatus for a disk player according to the first aspect of the present invention in which the spring constants of the inner circumferential side wire-form elastic members and the outer circumferential side wire-form elastic members, and the distances to the point of application have a relationship of FiTi=FoTo (wherein: Fi is the spring constant of the inner circumferential side wire-form elastic members; Ti is the distance from the inner circumferential side wire-form elastic members to the point of application; Fo is the spring constant of the outer circumferential side wire-form elastic members; and To is the distance from the outer circumferential side wire-form elastic members to the point of application).

A lens driving apparatus for a disk player according to the fourth aspect of the present invention is the lens driving apparatus for a disk player according to one of first to third aspects of the present invention in which the inner circumferential side wire-form elastic members and the outer circumferential side wire-form elastic members are formed by plate springs having the same thickness in the focus direction, and a width of each of the inner circumferential side wire-form elastic members in the tracking direction is greater than a width of each of the outer circumferential side wire-form elastic members in the tracking direction.

A lens driving apparatus for a disk player according to the fifth aspect of the present invention has a lens holder including an objective lens, focus coils, and tracking coils fixed thereto which is supported by a plurality of cantilevered wire-form elastic members, and drives the lens holder in focus and tracking directions. The wire-form elastic members include upper side wire-form elastic members and lower side wire-form elastic members which are disposed to be apart from each other in the focus direction so as to interpose therebetween a point of application of a tracking driving force generated from the tracking coils, and the upper side wire-form elastic members and the lower side wire-form elastic members have respectively different spring constants when deflected in the tracking direction, and have respectively different distances to the point of application in the focus direction.

BRIEF DESCRIPTION OF THE DRAWINGS

FIG. 10 is a diagram illustrating a structure of an upper suspension frame used in the movable portion;

FIG. 11 is a diagram illustrating a structure of a lower suspension frame used in the movable portion;

DETAILED DESCRIPTION OF PREFERRED EMBODIMENTS

Figure 1:
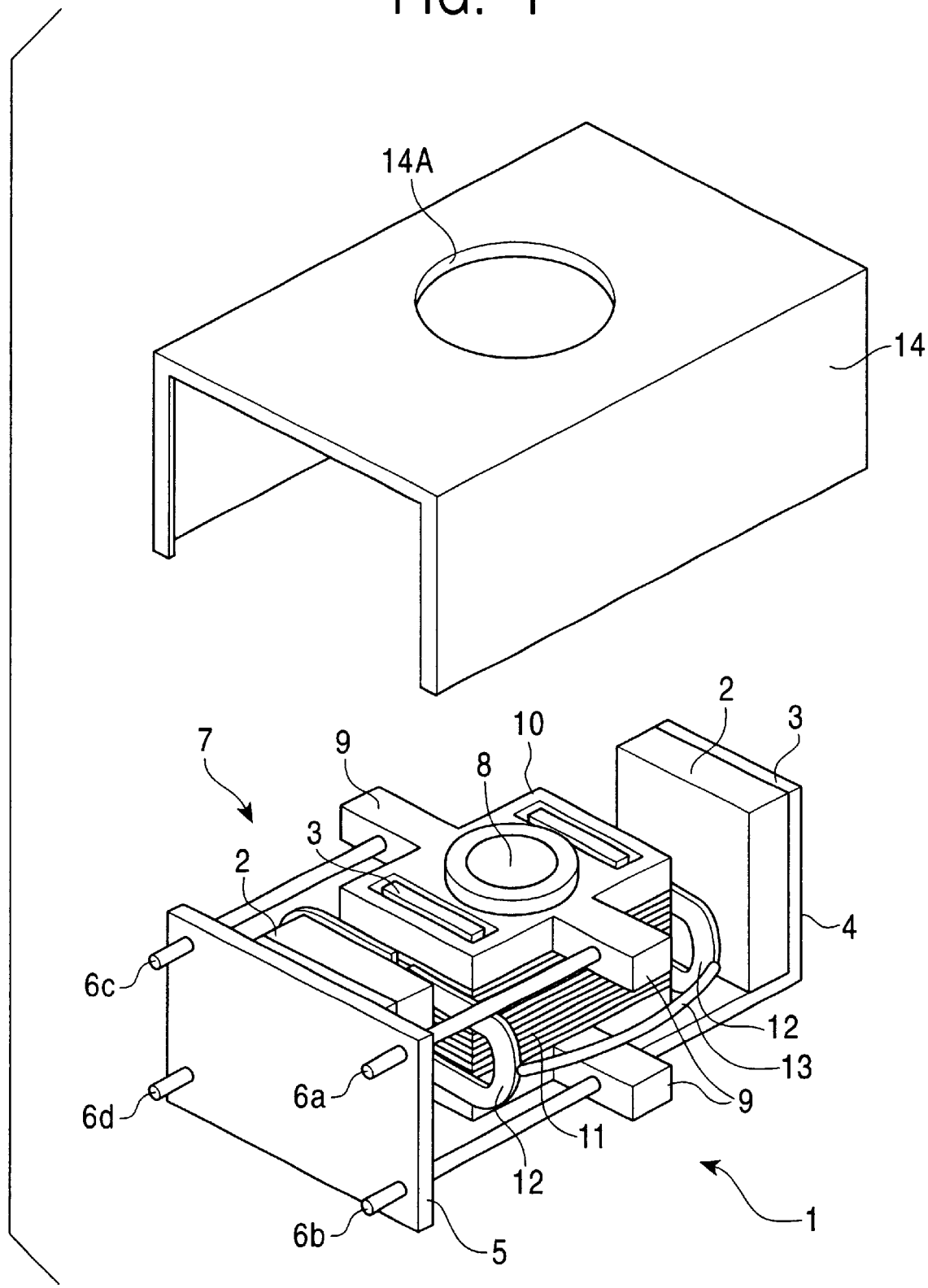
FIG. 1 is a diagram illustrating a structure of a conventional pick-up device.
Figure 2A:
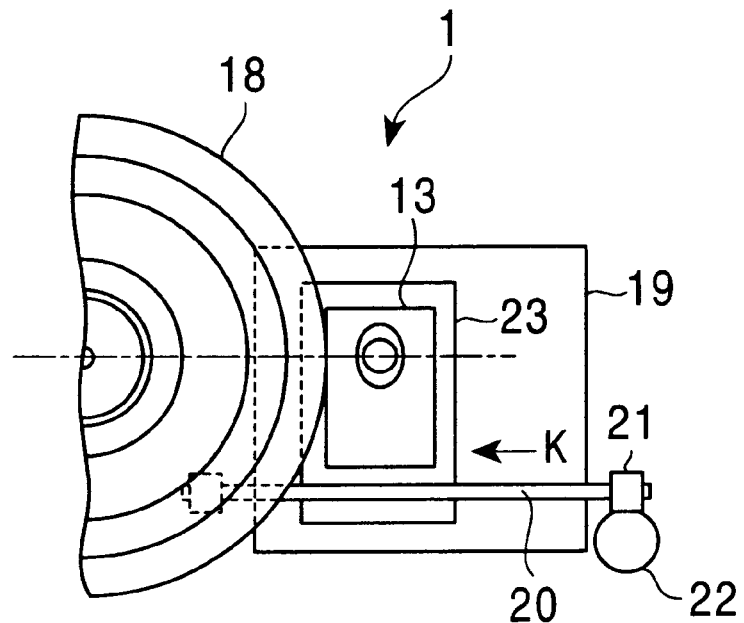
FIG. 2A and FIG. 2B are diagrams illustrating a problem of the conventional pick-up device.
Figure 2B:
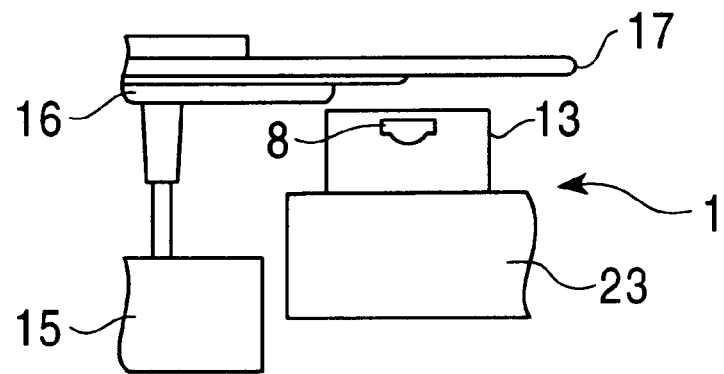
Figure 3:
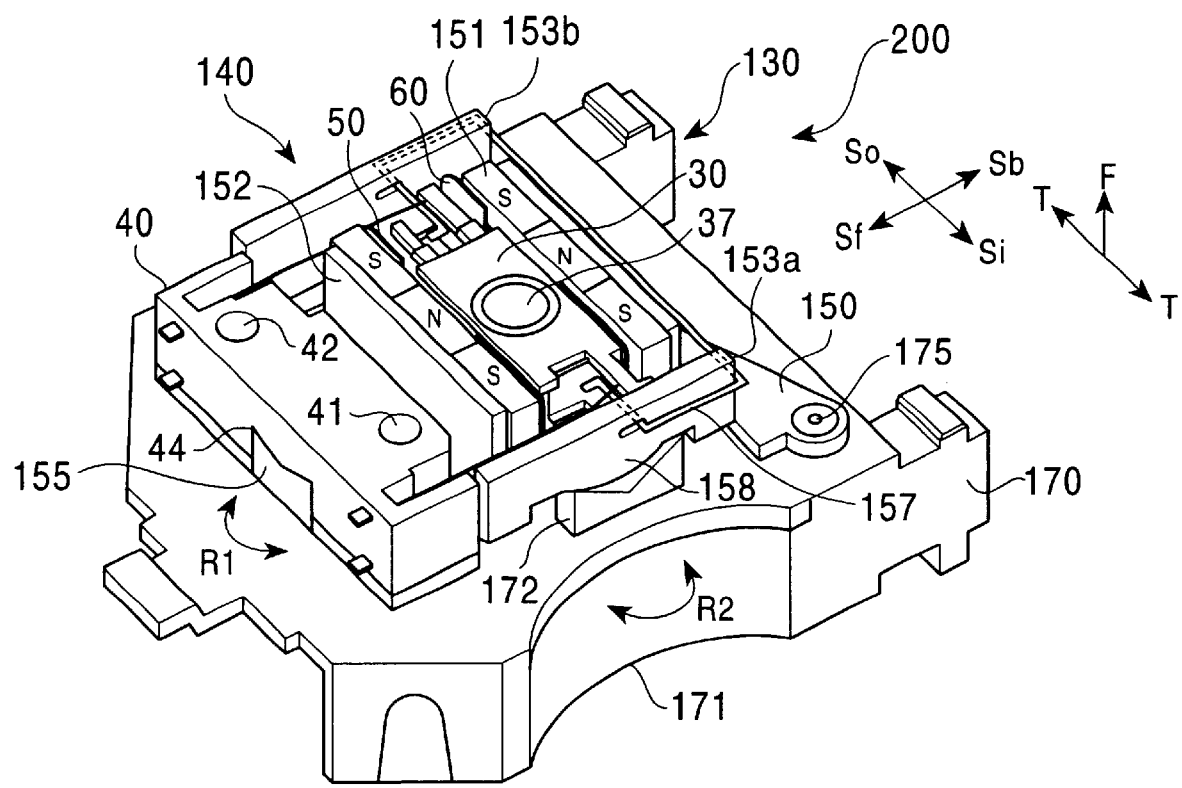
FIG. 3 is a perspective view illustrating a pick-up device according to an example of the present invention.
Figure 4:
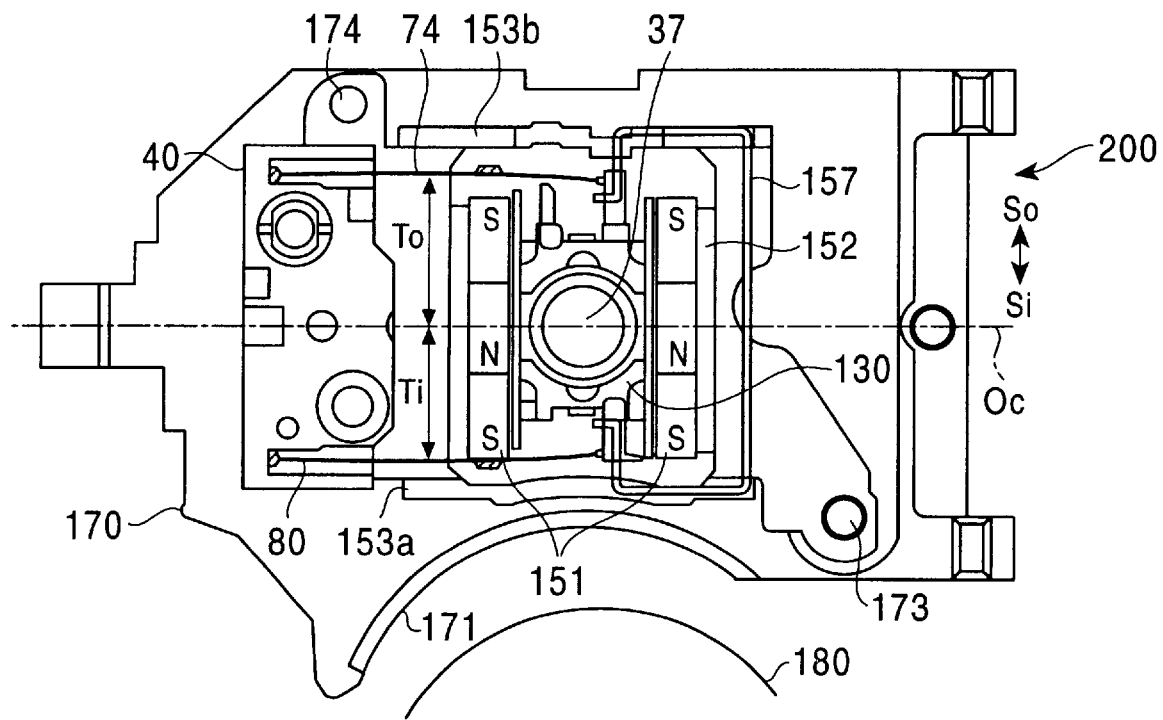
FIG. 4 is a plan view illustrating the pick-up device according to the example of the present invention.
Figure 5:
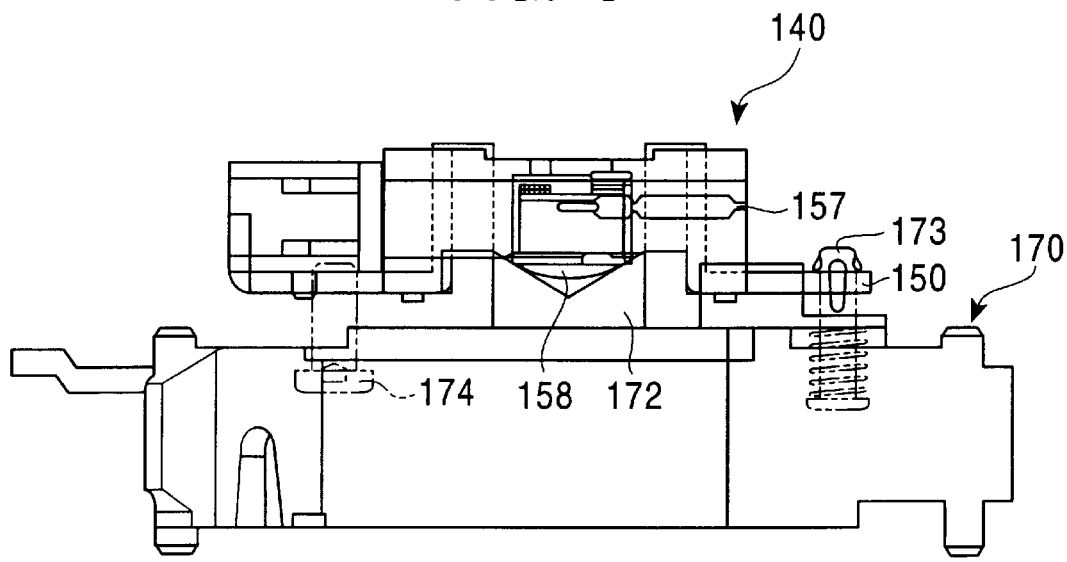
FIG. 5 is a side view illustrating the inner circumference side of the pick-up device according to the example of the present invention.

FIG. 3 is a perspective view illustrating an important portion of a pick-up device 200 according to an example of the present invention. FIG. 4 is a plan view illustrating the pick-up device 200, and FIG. 5 is a side view illustrating the pick-up device 200 when viewed from the side of a spindle motor 180. The structure of the pick-up device 200 will be described below with reference to FIGS. 3–5.

The pick-up device 200 of the present invention comprises: an actuator section 140 in which a movable portion 130 including a printed board A coil 50 and a printed board B coil 60 which are fixed to the respective side surfaces of a lens holder 30 containing an objective lens 37 is connected to an actuator base 40 by four wire-form elastic members 74, 94, 80, and 104 so as to be movably supported; a suspension base 150 including, at the respective side surfaces of the movable portion 130, a pair of yokes 152 to which a pair of multi-polarized magnets 151 which include I-shaped N poles and U-shaped S poles and which are disposed so as to be opposed to each other with a predetermined magnetic space therebetween, are fixed, and including standing portions 153 which are disposed so as to be opposed to each other and to surround the side surfaces of the movable portion 130 in tracking directions (directions indicated by arrows T in the figure); and a pick-up body 170 for containing optical components (not shown) such as a light source, a collimator lens, and a beam splitter, which is formed by aluminum die casting, or the like, and includes a semicircular concave portion 171 along a side surface which approaches to the spindle motor 180 (hereinafter, such an approaching direction is referred to as an "inner circumferential direction" and represented by an arrow Si in the figures, and an outer circumferential direction opposite to the inner circumferential direction is denoted by So).

The actuator section 140 is fixed to the actuator base 150 by inserting a screw with a spring (not shown) and a fixing screw (not shown) into two mounting holes 41 and 42 of the actuator base 40. The actuator section 140 is fixed by a V-shaped groove 44 formed on the bottom surface of the actuator base 40 and an M-shaped protruding plate 155 formed in the suspenstion base 150 after performing a positional alignment operation in the directions indicated by arrows R1 in FIG. 3. One end of the actuator section 140 is inserted around a pole with a spring 173 which is fixed to a pick-up body 170, and the other end thereof is fixed by a fixing screw 174. The actuator base 150 is fixed by protrusions 158 formed in the standing portions 153a and 153b and M-shaped holders 172 of the pick-up body 170 after performing a positional alignment operation in the directions indicated by arrows R2 in the figure.

In the pick-up device 200 according to the example of the present invention, the semicircular concave portion 171 is formed along a side surface of the pick-up body 170 in the inner circumferential Si direction, thereby making it easier for the pick-up device to come close to the spindle motor 180. In the pick-up device 200, as shown in FIG. 4, a distance Ti from the wire-form elastic members 80 and 104 supporting the movable portion 130 to an optical central line of the objective lens 37 (the line which includes an optical axis of the objective lens 37 and which is perpendicular to a tracking direction: the line is denoted by Oc) is set to be smaller than a distance To from the wire-form elastic members 74 and 94 to the optical central line Oc of the objective lens 37. By providing the wire-form elastic members 74 and 94 and the wire-form elastic members 80 and 104, respectively supporting the movable portion 130, at asymmetrical positions with respect to the optical central line Oc of the objective lens 37 in the above-described manner, the objective lens 37 of the pick-up device 200 can further approach to the inner circumference of the optical disk.

As described above, in the pick-up device 200 according to the example of the present invention, the semicircular concave portion 171 is provided in the pick-up body 170, and the four wire-form elastic members 74, 94, 80, and 104 supporting the movable portion 130 are fixed at asymmetrical positions with respect to the optical central line Oc of the objective lens 37. As a result, the pick-up device 200 can further approach to the spindle motor 180 and the inner circumference of the optical disk.

Although the thus-structured movable portion 130 generates a rotation moment, the pick-up device 200 according to the example of the present invention realizes a small size and a light weight without generating a rotation moment by devising the structure of the actuator section 140. The entire structure of the actuator section 140 used in the pick-up device 200 according to the example of the present invention will now be described with reference to FIG. 6, and structures of components forming the actuator section 140 will be described below in detail.

Figure 6:
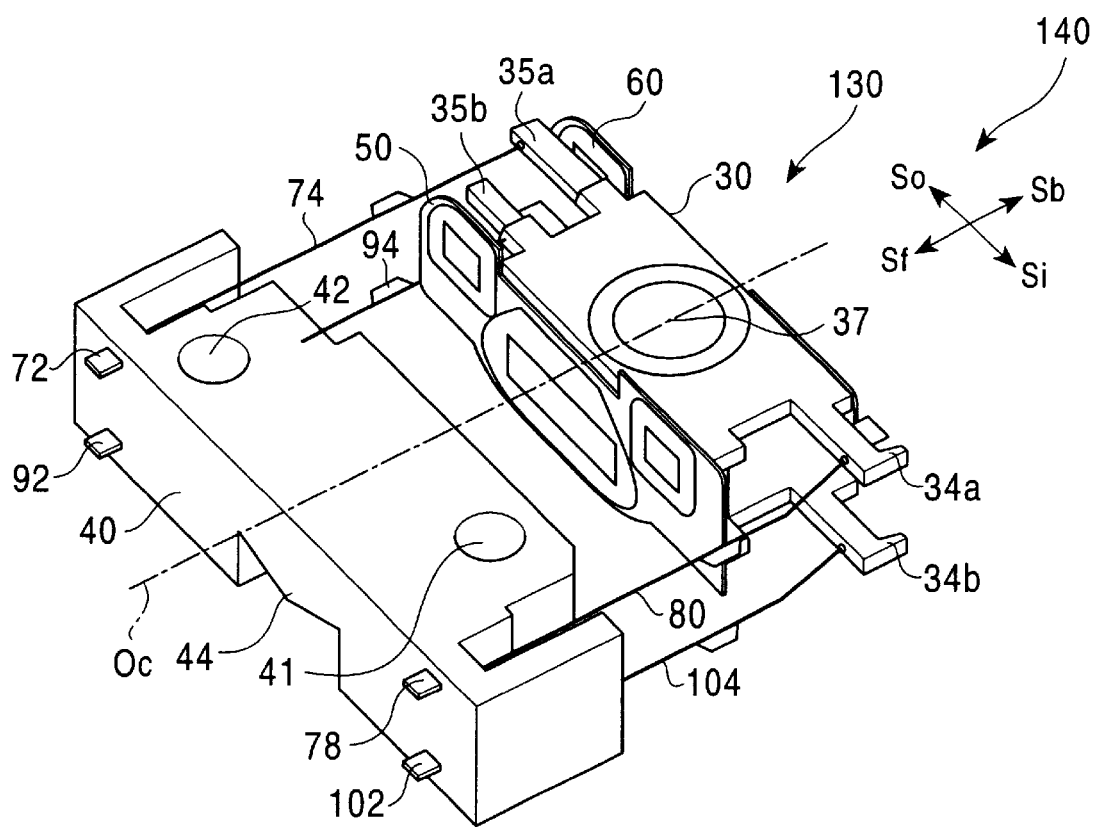
FIG. 6 is a perspective view illustrating an actuator section forming a part of the pick-up device.

As shown in FIG. 6, the actuator section 140 has such a structure that the movable portion 130, in which the printed board A coil 50 is fixed to a side surface of the lens holder 30 containing the objective lens 37 in a forward direction (the direction indicated by an arrow Sf in the figures) and the printed board B coil 60 is fixed to a side surface of the lens holder 30 in a backward direction (the direction indicated by an arrow Sb in the figures), is movably supported by the four wire-form elastic members 74, 80, 94, and 104 which are fixed to the actuator base 40. The four wire-form elastic members 74, 80, 94, and 104 forming a part of the actuator section 140 are integrally molded by insert molding when the lens holder 30 and the actuator base 40 are molded out of a resin.

Figure 7A:
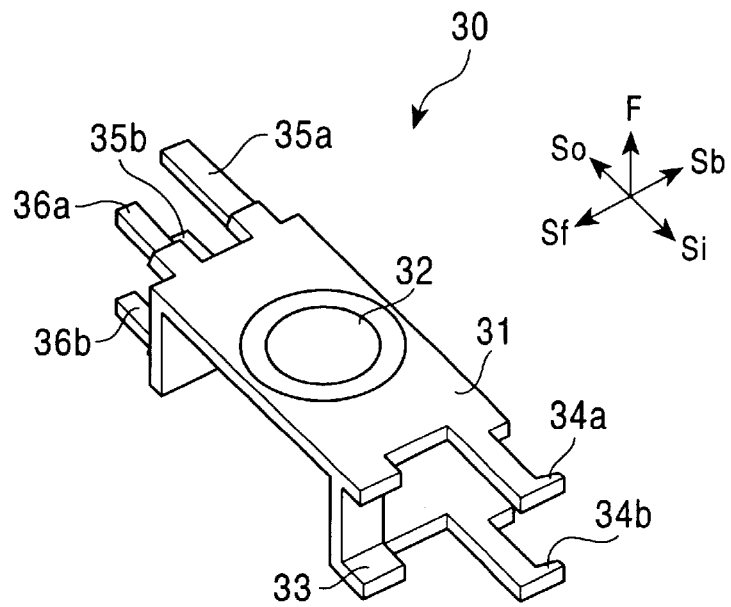
FIG. 7A and FIG. 7B are perspective views respectively illustrating a lens holder and an actuator base forming a part of a movable portion.
Figure 7B:
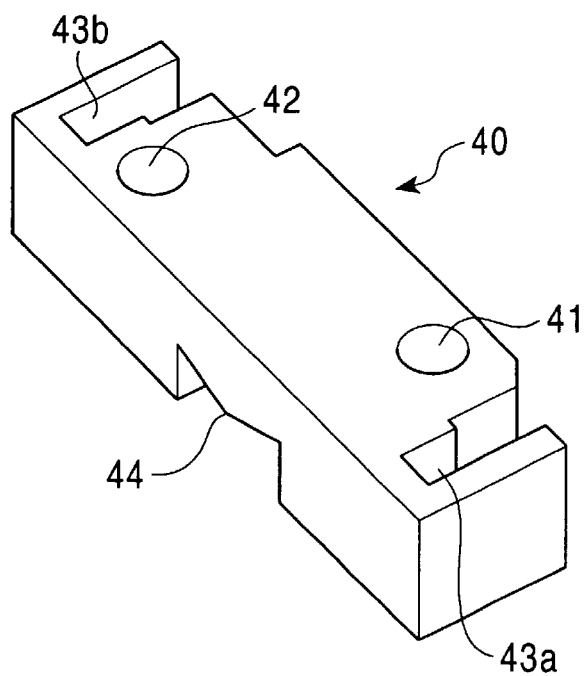

The lens holder 30 and the actuator base 40 forming parts of the actuator section 140 have structures shown in FIG. 7A and FIG. 7B, respectively. FIG. 7A is a perspective view illustrating the lens holder 30, and FIG. 7B is a perspective view illustrating the actuator base 40.

The lens holder 30 is a resin-molded member having a generally rectangular shape and a hollow structure. The lens holder 30 comprises: an open window 32 for the objective lens 37 which is provided at an approximately center of a top surface 31; a pair of fixed arms 34a and 34b which are elastic member fixed portions provided closer to the backward direction Sb of the lens holder 30 and horizontally protruding in the inner circumferential Si direction respectively from the top surface 31 and a bottom surface 33 provided at a position apart from the top surface 31 in a focus direction (the direction indicated by an arrow F in the figure); a pair of fixed arms 35a and 35b which are elastic member fixed portions provided closer to the backward direction Sb of the lens holder 30 and horizontally protruding in the outer circumferential So direction respectively from the top surface 31 and the bottom surface 33; and a pair of protruding portions 36a and 36b which are terminal fixing portions provided closer to the forward direction Sf of the lens holder 30 and horizontally protruding in the outer circumferential So direction respectively from the top surface 31 and the bottom surface 33.

As shown in FIG. 7B, the actuator base 40 is a resin-molded member having a generally rectangular shape. The actuator base 40 comprises: two mounting holes 41 and 42 which are formed so as to be fixed to the supension base 150; grooves 43*a* and 43*b* with which the four wire-form elastic members 74, 80, 94, and 104 are integrally molded at the respective sides in the longitudinal direction; and the Vshaped groove 44 which is used for a positional alignment operation and which is provided on the bottom surface thereof.

Figure 8:
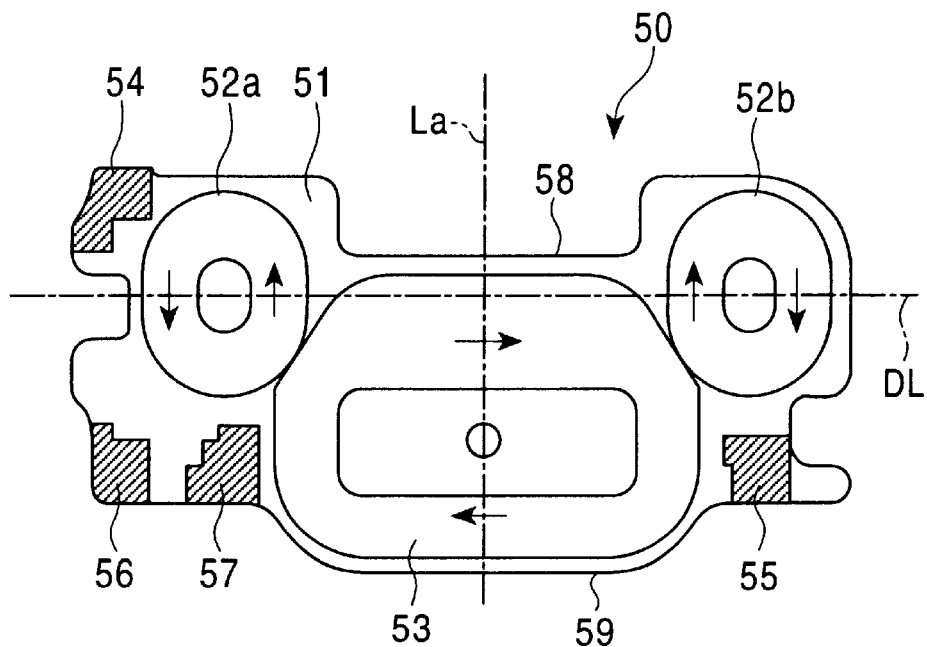
FIG. 8 is a diagram illustrating a structure of a printed board A coil forming a part of the movable portion.
Figure 9:
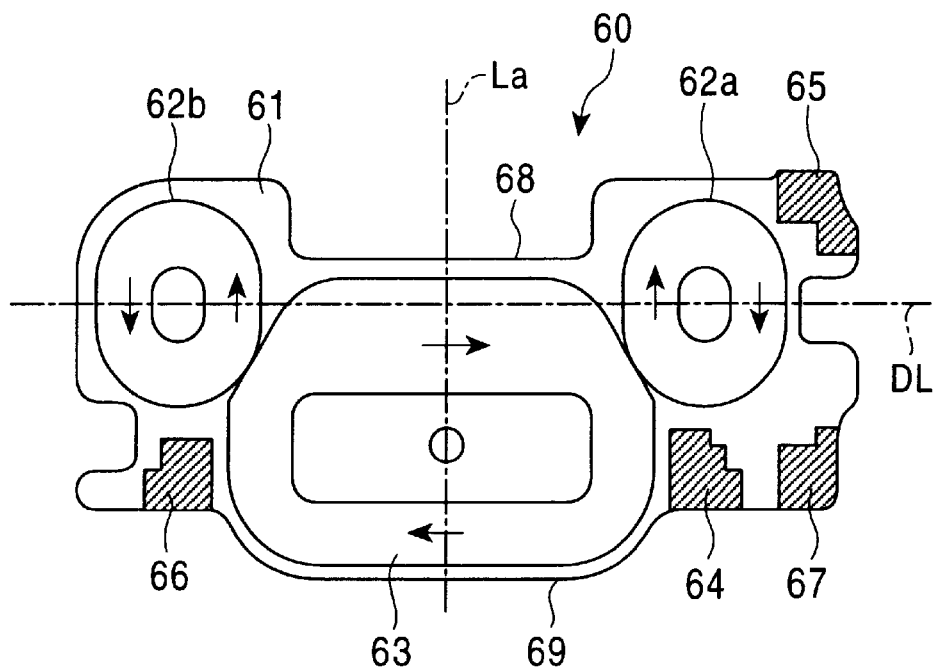
FIG. 9 is a diagram illustrating a structure of a printed board B coil forming a part of the movable portion.

Next, the structures of the printed board A coil 50 and the printed board B coil 60 which are to be driving coils forming parts of the movable portion 130 will be described with reference to FIG. 8 and FIG. 9. Since the printed board A coil 50 illustrated in FIG. 8 is fixed to the side surface of the lens holder 30 in the forward direction Sf, coils and terminals which will be described later are formed at the side of the lens holder 30. Therefore, these coils and terminals are shown through the substrate 51 for the purpose of illustration. The coils and terminals are formed on the same plane on the reverse side of the paper of the figure. Since the printed board B coil 60 illustrated in FIG. 9 is fixed to the side surface of the lens holder 30 in the backward direction Sb, FIG. 9 shows a state in which coils and terminals are formed on the same plane on the front side of the figure.

In the printed board A coil 50, coils, wires, and the like, are formed on the plane substrate 51 as shown in FIG. 8 by pattern formation through copper plating, and a tracking A coil 52*a*, a tracking B coil 52*b*, a focus A coil 53, and four terminal parts formed by copper foils (a tracking A input terminal part 54, a tracking A output terminal part 55, a focus A input terminal part 56, and a focus A output terminal part 57) are formed on the same plane. The tracking A coil 52*a* and the tracking B coil 52*b* are positioned above the substrate 51, and are formed in the same shape symmetrically with respect to an optical axis La. The coil center of the focus A coil 53 is on the optical axis La, and the focus A coil 53 is formed below a line of action DL connecting the coil center of the tracking A coil 52*a* with the coil center of the tracking B coil 52*b*. Since the substrate 51 also carries a later-described counter weight of the movable portion 130, it includes a notch portion 58 at which an upper portion of the substrate 51 is notched and a convex portion 59 at which a lower portion thereof is protruded.

Next, a connection method of the printed board A coil 50 will be described below. The tracking A coil 52*a* which is connected to the tracking A input terminal part 54 is formed counterclockwise from the outer circumference toward the inner circumference, and is connected to the tracking B coil 52*b* via a through hole and a copper foil (not shown). The tracking B coil 52*b* is formed clockwise from the inner circumference toward the outer circumference, and is connected to the tracking A output terminal part 55. Therefore, the tracking A coil 52*a* and the tracking B coil 52*b* are serially connected with each other between the tracking A input terminal 54 and the tracking A output terminal part 55.

The focus A coil 53 which is connected to the focus A input terminal part 56 is formed clockwise from the outer circumference toward the inner circumference, and is connected to the focus A output terminal part 57 via a through hole and a copper foil.

In the printed board B coil 60 illustrated in FIG. 9, coils, wires, and the like, are formed on a plane substrate 61 by pattern formation through copper plating in the same manner as that in the printed board A coil 50, and a tracking C coil 62*a*, a tracking D coil 62*b*, a focus B coil 63, and four terminal parts formed by copper foils (a tracking B input terminal part 64, a tracking B output terminal part 65, a focus B input terminal part 66, and a focus B output terminal part 67) are formed on the same plane. The tracking C coil 62*a* and the tracking D coil 62*b* are positioned above the substrate 61, and are formed in the same shape symmetrically with respect to the optical axis La. The coil center of the focus B coil 63 is on the optical axis La, and the focus B coil 63 is formed below a line of action DL connecting the coil center of the tracking C coil 62*a* with the coil center of the tracking D coil 62*b*. The substrate 61 includes a notch portion 68 at which an upper portion of the substrate 61 is notched and a convex portion 69 at which a lower portion thereof is protruded.

Next, a connection method of the printed board B coil 60 will be described below. The tracking C coil 62*a* which is connected to the tracking B input terminal part 64 is formed clockwise from the outer circumference toward the inner circumference, and is connected to the tracking D coil 62*b* via a through hole and a copper foil (not shown). The tracking D coil 62*b* is formed counterclockwise from the inner circumference toward the outer circumference, and is connected to the tracking B output terminal part 65. Therefore, the tracking C coil 62*a* and the tracking D coil 62*b* are connected in series with each other between the tracking B input terminal part 64 and the tracking B output terminal part 65.

The focus B coil 63 which is connected to the focus B input terminal part 66 is formed clockwise from the outer circumference toward the inner circumference, and is connected to the focus B output terminal part 67 via a through hole and a copper foil.

Next, the structures of the four wire-form elastic members 74, 80, 94, and 104 which are formed by insert molding when the lens holder 30 and the actuator base 40 are resin-molded will be described with reference to FIGS. 10 and 11. FIG. 10 is a plan view illustrating an upper suspension frame 70 after a metal flat plate is subjected to a press process, or the like, so as to punch out unnecessary portions, thereby forming the two wire-form elastic members 74 and 80 and connection portions thereof. FIG. 11 is a plan view illustrating a lower suspension frame 90 after a metal flat plate is subjected to a press process, or the like, so as to punch out unnecessary portions, thereby forming the two wire-form elastic members 94 and 104 and connection portions thereof.

The upper suspension frame 70 is positioned at the side of the top surface 31 of the lens holder 30 when integrally molded with the lens holder 30, and carries a tracking input terminal 72 and a tracking output terminal 78 which will be described later. The lower suspension frame 90 is positioned at the side of the bottom surface 33 of the lens holder 30 when integrally molded with the lens holder 30, and carries a focus input terminal 92 and a focus output terminal 102 which will be described later.

Since the upper suspension frame 70 and the lower suspension frame 90 have a suspension function and a wiring function of supplying a driving current to the printed board coils 50 and 60, they are formed respectively by thin (for example, a thickness of about 0.1 mm) metal plates 71 and 91 each having an elasticity and a high conductivity, e.g., titanium copper, phosphor bronze, or beryllium copper. Each of the metal plates 71 and 91 is a hoop member having a long length. The metal plates 71 and 91 are formed by a punching process with a die so as to connect the four wire-form elastic members 74, 80, 94, and 104 and connection portions thereof with a framing member 77 by a plurality of holding members 76. A plurality of metal plates 71 and 91 are provided with a predetermined pitch in consideration of the productivity.

In the upper suspension frame 70, as shown in FIG. 10, the tracking input terminal 72 which is insert-molded into the suspension base 150 and a tracking A input connecting part 73 which is insert-molded into the lens holder 30 are connected by the wire-form elastic member (outer circumferential A wire) 74 and an A coupling member 75, and held by the framing member 77 through the holding members 76. The tracking output terminal 78 which is insert-molded into the upper suspension frame 70 and a tracking B output connecting part 79 which is insert-molded into the lens holder 30 are connected by the wire-form elastic member (inner circumferential A wire) 80, and held by the framing member 77 through the holding members 76. The framing member 77 of the upper suspension frame 70 includes a plurality of fixing holes 81 for accurately fixing it at a predetermined position of a later-described mold.

In the lower suspension frame 90, as shown in FIG. 11, the focus input terminal 92 which is insert-molded into the suspension base 150 and a focus A input connecting part 93 which is insert-molded into the lens holder 30 are connected by the wire-form elastic member (outer circumferential B wire) 94 and a B coupling member 95, and held by the framing member 97 through the holding members 96. A focus B input connecting part 99, which is connected with the outer circumferential B wire 94 through a C coupling member 98, is connected with a focus B output connecting part 101 by a D coupling member 100.

The focus output terminal 102 which is insert-molded into the suspension base 150 and a focus B output connecting part 103 which is insert-molded into the lens holder 30 are connected by the wire-form elastic member (inner circumferential B wire) 104, and held by the framing member 97 via the holding members 96. A tracking A output connecting part 106 is connected to the inner circumferential B wire 104 by an E coupling member 105, and a tracking B input connecting part 108 is connected to the tracking A output connecting part 106 by a F coupling member 107. A plurality of fixing holes 109 is formed in the framing member 97 of the lower suspension frame 90 as in the upper suspension frame 70.

The upper suspension frame 70 and the lower suspension frame 90 are formed by the metal plates 71 and 91 having the same thickness (H). The outer circumferential A wire 74 of the upper suspension frame 70 and the outer circumferential B wire 94 of the lower suspension frame 90 are formed at the same positions with respect to the framing members 77 and 97, respectively, and they are formed so as to have the same width (Wo). The inner circumferential A wire 80 of the upper suspension frame 70 and the inner circumferential B wire 104 of the lower suspension frame 90 are formed at the same positions with respect to the framing members 77 and 97, respectively, and they are formed so as to have the same width (Wi). The width (Wo) of each of the outer circumferential A wire 74 of the upper suspension frame 70 and the outer circumferential B wire 94 of the lower suspension frame 90 is set to be smaller than the width (Wi) of each of the inner circumferential A wire 80 of the upper suspension frame 70 and the inner circumferential B wire 104 of the lower suspension frame 90 (details will be described later). The structures of the components forming the actuator section 140 are as described above.

Next, a method for producing the actuator section 140 will be described with reference to FIGS. 12 to 17C. First, a structure of a mold and a procedure of resin molding used when the lens holder 30 and the actuator base 40 are integrally molded using the upper suspension frame 70 and the lower suspension frame 90 will be described with reference to FIG. 12. The mold is obtained by integrally forming a resin space of the lens holder 30 and that of the actuator base 40. However, for the purpose of simplified illustration, FIG. 12 is a diagram illustrating the structure of an important portion of the mold which only shows the portion of the lens holder 30, and the details thereof are omitted therein.

Figure 12:
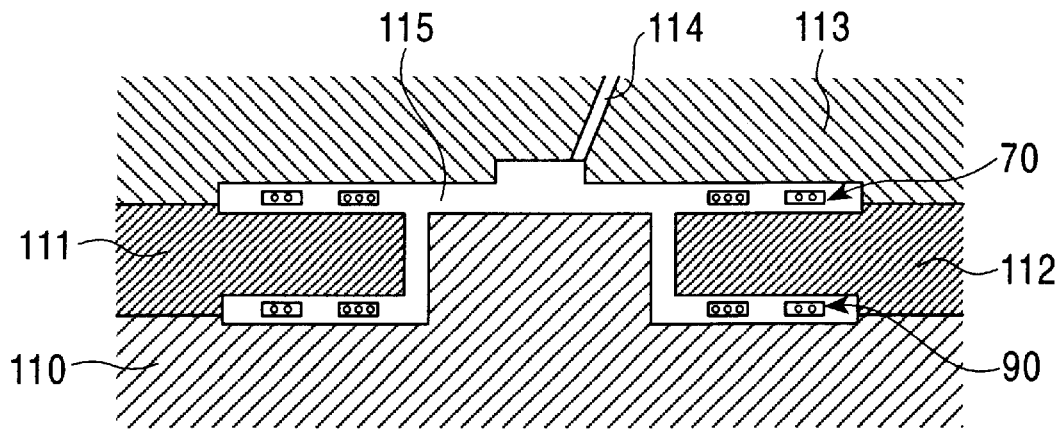
FIG. 12 is a diagram illustrating a structure of an important portion of a mold used when molding a suspension unit.

As shown in FIG. 12, the mold is comprised of four mold portions, i.e., a lower fixed mold portion 110, a pair of left movable mold portion 111 and a right movable mold portion 112, and an upper movable mold portion 113. The mold also includes an injection hole 114 for injecting a resin into the upper movable mold portion 113. First, the lower suspension frame 90 is fixed to this mold.

The lower suspension frame 90 is fixed to a predetermined position in the lower fixed mold portion 110 of the mold. Since the lower fixed mold portion 110 includes positioning pins (not shown), the positioning pins are inserted into the fixing holes 109 of the lower suspension frame 90, thereby accurately positioning the lower suspension frame 90 with respect to the lower fixed mold portion 110. Next, the left movable mold portion 111 and the right movable mold portion 112 are mounted onto predetermined positions of the lower fixed mold portion 110 so as to interpose the lower suspension frame 90. Thereafter, the upper suspension frame 70 is fixed to predetermined positions of the left movable mold portion 111 and the right movable mold portion 112. As in the lower fixed mold portion 110, the left movable mold portion 111 or the right movable mold portion 112 includes positioning pins (not shown), the positioning pins are inserted into the fixing holes 81 of the upper suspension frame 70, thereby accurately positioning the upper suspension frame 70 with respect to the left movable mold portion 111 and the right movable mold portion 112. Finally, the upper movable mold portion 113 is mounted onto the left movable mold portion 111 and the right movable mold portion 112 so as to interpose the upper suspension frame 70. Thus, containment of the upper suspension frame 70 and the lower suspension frame 90 into the mold is completed, and a resin space 115 for the lens holder 30 is formed so as to surround the upper suspension frame 70 and the lower suspension frame 90. The above-described step is a first step of the production method.

Figure 13:
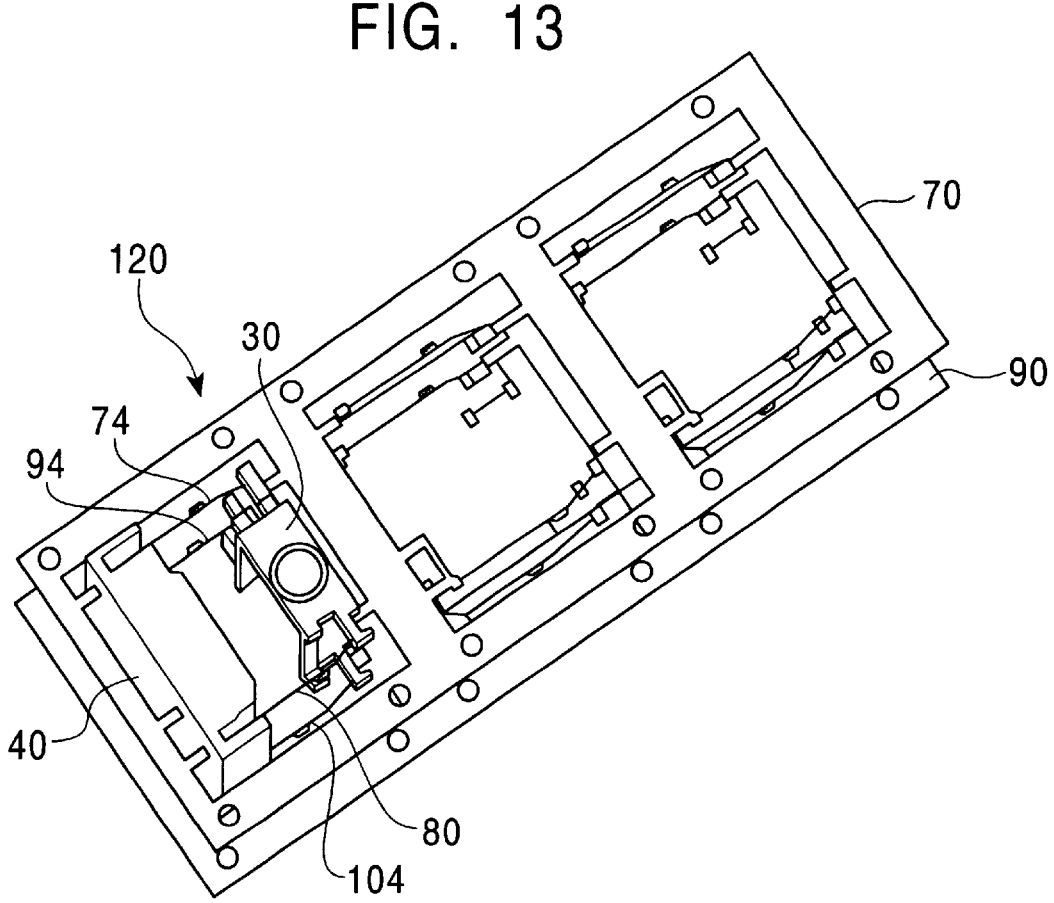
FIG. 13 is a perspective view illustrating an enclosed form of the suspension unit.

Next, a resin is filled into the resin space 115 through the injection hole 114. After the resin is cured, and the molding of the lens holder 30 and the actuator base 40 is completed, the mold is disassembled in an order reverse of the above-described mold assembling procedure. In the disassembling procedure, the left movable mold portion 111 and the right movable mold portion 112 are demounted by sliding them in the left and right directions, respectively. The left movable mold portion 111 and the right movable mold portion 112 are once fixed with being slid respectively in the left and right directions, and an ultraviolet curable resin damping material is then applied to the aforementioned grooves 43a and 43b which are formed at the respective sides of the actuator base 40. Thereafter, the left movable mold portion 111 and the right movable mold portion 112 are demounted. FIG. 13 illustrates a state after the above-described mold is disassembled, i.e., a suspension unit 120 including a plurality of the upper suspension frames 70 and the lower suspension frames 90 in a ladder shape with which the lens holders 30 and the actuator bases 40 are integrally molded is completed. The aforementioned step is a second step of the production step.

Before describing a third step of the production method in which terminals of the printed board A coil 50 and the printed board B coil 60 (hereinafter, referred to as "two printed board coils 50 and 60") which are fixed to the lens holder 30 are connected with the four wire-form elastic members 74, 80, 94, and 104 and the connection portions thereof which are fixed to the lens holder 30, a step of cutting the framing members 77 and 97 respectively adjacent to the upper suspension frame 70 and the lower suspension frame 90 and unnecessary members, which is performed prior to the third step, will be described below with reference to FIG. 14 and FIG. 15.

Figure 14:
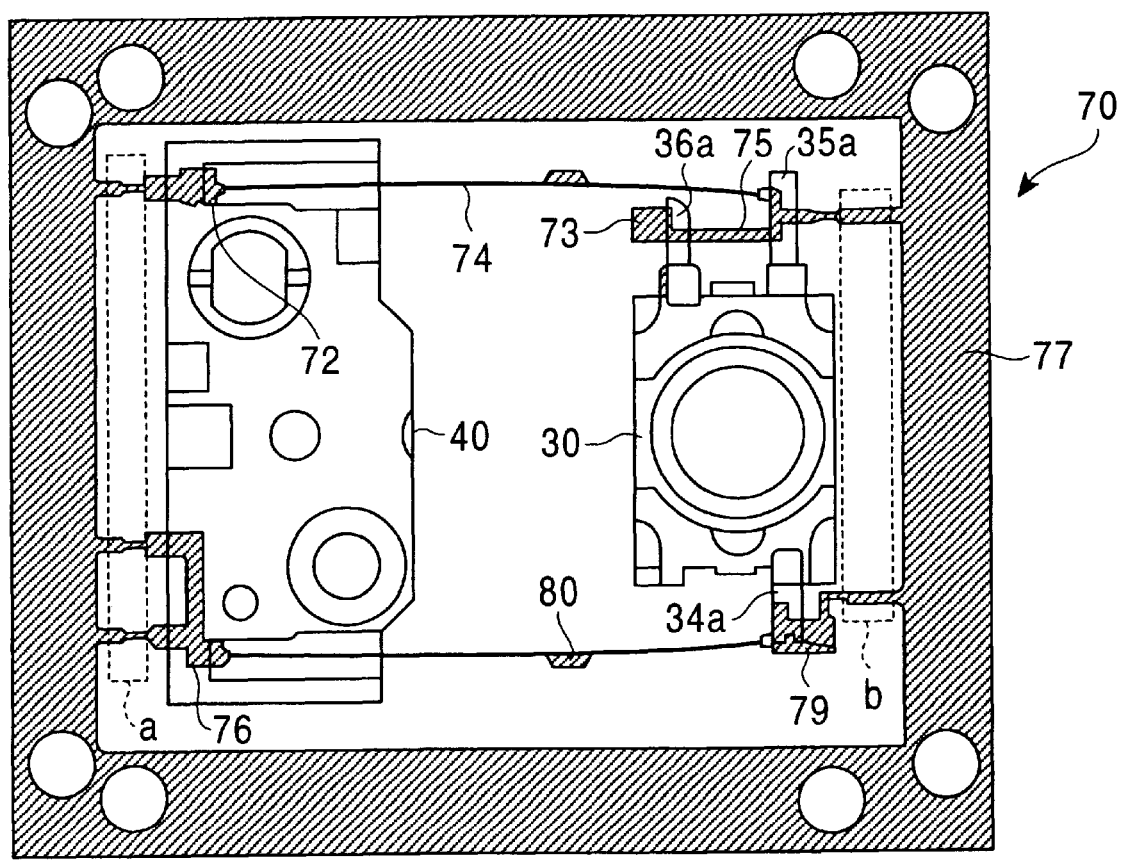
FIG. 14 is a diagram illustrating a cut section of the upper suspension frame with which a lens holder and a suspension base are integrally molded.

FIG. 14 is a phantom plan view illustrating a state in which the lens holder 30 and the actuator base 40 are integrally molded into the upper suspension frame 70. The lens holder 30 shows the pair of fixed arms 34a and 35a and the protruding portion 36a which are formed at the side of the top surface 31. As shown in FIG. 14, the fixation is performed while parts of the outer circumferential A wire 74, the inner circumferential A wire 80, the coupling portions thereof, and the like, are included in the resin, and tips of the connection portions are exposed from the resin. FIG. 15 is a phantom plan view illustrating a state in which the lens holder 30 and the actuator base 40 are integrally molded into the lower suspension frame 90. The lens holder 30 shows the pair of fixed arms 34b and 35b and the protruding portion 36b which are formed at the side of the bottom surface 33. As shown in FIG. 15, the fixation is performed while parts of the outer circumferential B wire 94, the inner circumferential B wire 104, the coupling portions thereof, and the like, are included in the resin, and tips of the connection portions are exposed from the resin.

By removing portions indicated by dotted frames in the figures, the upper suspension frame 70 and the lower suspension frame 90 are cut off respectively from the framing members 77 and 97 while the lens holder 30 and the actuator base 40 are being connected with the four wire-form elastic members 74, 80, 94, and 104, thereby obtaining the suspension unit 120.

The two portions of the upper suspension frame 70, which are indicated by the dotted frames a and b in the figure, are removed by laser cutting or a punching process as shown in FIG. 14. The outer circumferential A wire 74 which is connected with the tracking input terminal 72 which is integrally molded into the actuator base 40 and cut off from the framing member 77 is cut off from the framing member 77 and fixed to the fixed arm 35a of the lens holder 30, and the tracking A input connecting part 73 which is connected to the outer circumferential A wire 74 by the A coupling member 75 is fixed to the protruding portion 36a while being exposed from the forward side surface of the lens holder 30. The inner circumferential A wire 80 connected with the tracking output terminal 76 which is integrally molded into the actuator base 40 and cut off from the framing member 77 is cut off from the framing member 77 and fixed to the fixed arm 34a of the lens holder 30, and the tracking B output connecting part 79 which is connected to the inner circumferential A wire 80 is fixed with being exposed from the backward side surface of the lens holder 30.

Figure 15:
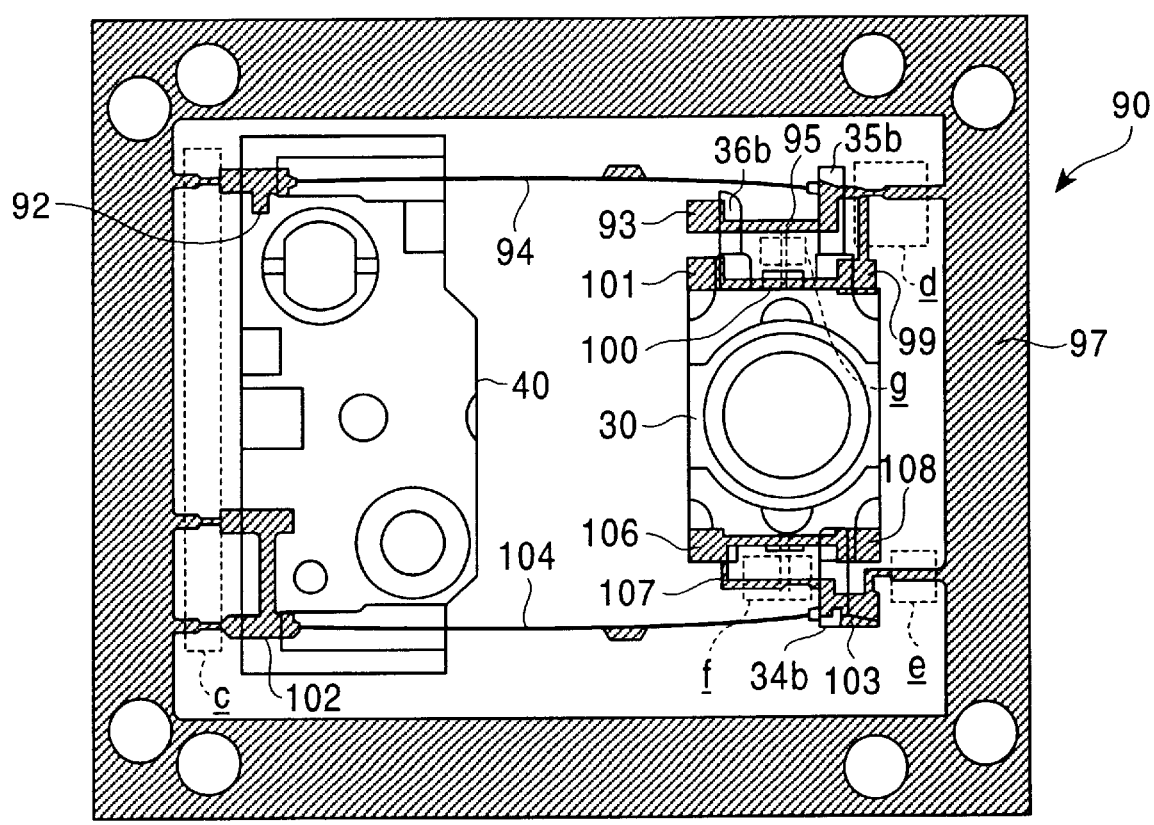
FIG. 15 is a diagram illustrating a cut section of the lower suspension frame with which a lens holder and a suspension base are integrally molded.

As shown in FIG. 15, five portions of the lower suspension frame 90, which are indicated by dotted frames c–g in the figure are removed by the same method as in above. The outer circumferential B wire 94 connected with the focus input terminal 92 which is integrally molded into the actuator base 40 and cut off from the framing member 97 is cut off from the framing member 97 and fixed to the fixed arm 35b of the lens holder 30. The focus A input connecting part 93 which is connected to the outer circumferential B wire 94 by the B coupling member 95 is fixed to the protruding portion 36b with being exposed from the forward side surface of the lens holder 30. The focus B input connecting part 99 which is cut off from the outer circumferential B wire 94 is fixed with being exposed from the backward side surface of the lens holder 30, and the focus B output connecting part 101, which is connected with the focus B input connecting part 99 by the D coupling member 100, is fixed with being exposed from the forward side surface of the lens holder 30.

The inner circumferential B wire 104 which is connected with the focus output terminal 102 which is integrally molded into the actuator base 40 and cut off from the framing member 97 is cut off from the framing member 97 and fixed to the fixed arm 34b of the lens holder 30, and the focus B output connecting part 103 which is connected with the inner circumferential B wire 104 is fixed with being exposed from the backward side surface of the lens holder 30. The tracking B input connecting part 108 which is cut off from the framing member 97 is fixed with being exposed from the backward side surface of the lens holder 30, and the tracking A output connecting part 106, which is connected with the tracking B input connecting part 108 by the F coupling member 107, is fixed with being exposed from the forward side surface of the lens holder 30.

Next, a connection method between the lens holder 30 and the two printed board coils 50 and 60, which is the aforementioned third step of the production method will be described with reference to FIG. 16. In order to facilitate the understanding of the structure of a soldered portion, FIG. 16 illustrates a state in which the printed board A coil 50 and the printed board B coil 60 are disposed at positions apart from the respective side surfaces of the lens holder 30, and the connection portions which are integrally molded into the lens holder 30 are schematically extended (indicated by dotted lines in the figure).

The connection portions of the lens holder 30 containing the objective lens 37 are formed so as to have such a positional relationship that they contact terminals formed in the printed board A coil 50 and the printed board B coil 60 which are fixed to predetermined positions of the lens holder 30.

Figure 16:
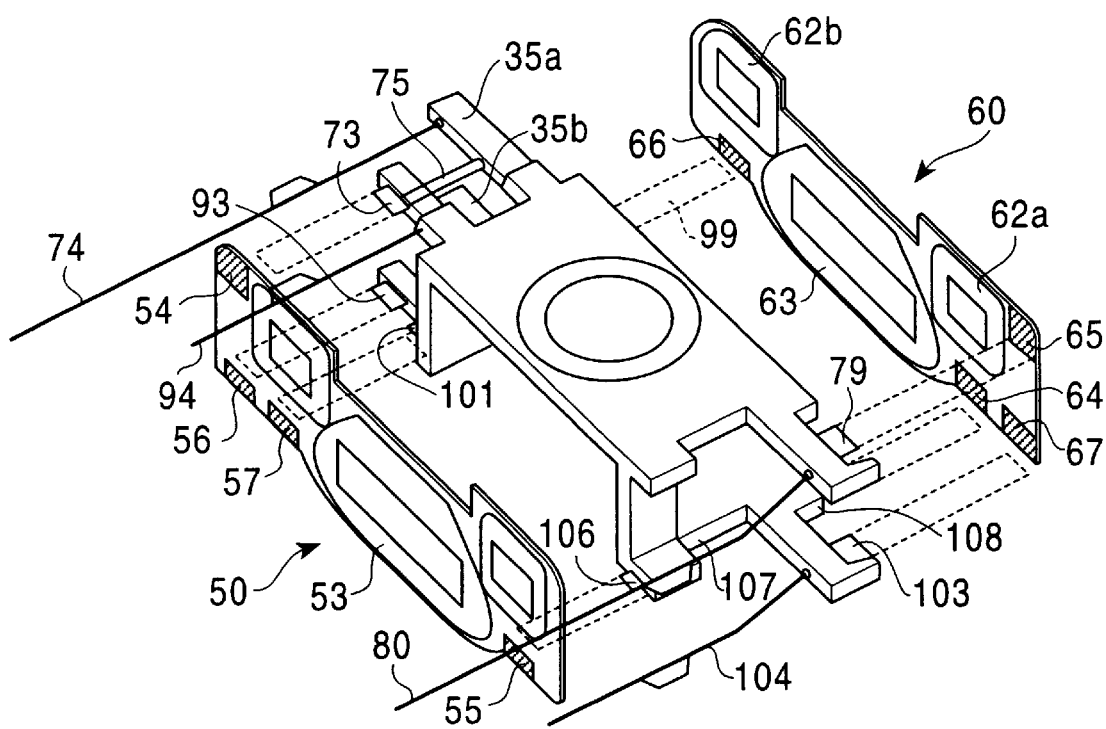
FIG. 16 is a perspective view illustrating a structure when printed board coils are connected with the suspension unit.

More specifically, as shown in FIG. 16, the four terminals of the printed board A coil 50 (the tracking A input terminal 54, the tracking A output terminal part 55, the focus A input terminal part 56, and the focus A output terminal part 57) have such a positional relationship that they abut on end faces of the four connection portions which are formed so as to be exposed from the forward side surface of the lens holder 30 (i.e., the tracking A input connecting part 73, the focus A input connecting part 93, the focus B output connecting part 101, and the tracking A output connecting part 106) with being fixed to the predetermined positions on the forward side surface of the lens holder 30. The four terminals of the printed board B coil 60 (the tracking B input terminal part 64, the tracking B output terminal part 65, the focus B input terminal part 66, and the focus B output terminal part 67) have such a positional relationship that they abut on end faces of the four connection portions which are formed so as to be exposed from the backward side surface of the lens holder 30 (i.e., the tracking B output connecting part 79, the focus B input connecting part 99, the focus B output connecting part 103, and the tracking B input connecting part 108). Therefore, by soldering them, the actuator section 140 is formed.

The outer circumferential A wire 74 which is connected to the tracking input terminal 72, is connected with the tracking A input terminal 54 via the A coupling member 75, and the tracking A input terminal 54 is soldered to the tracking A input terminal 54 of the printed board A coil 50. The tracking A output terminal part 55 of the printed board A coil 50 is soldered to the tracking A output connecting part 106 of the lens holder 30, and the tracking B input connecting part 108 of the lens holder 30, which is connected with the tracking A output connecting part 106 via the F coupling member 107, is soldered to the tracking B input terminal part 64 of the printed board B coil 60. The inner circumferential A wire 80, which is connected with the tracking output terminal 78, is connected with the tracking B output connecting part 79, and the tracking B output connecting part 79 is soldered to the tracking B output terminal part 65 of the printed board B coil 60.

The tracking A coil 52*a* and the tracking B coil 52*b* of the printed board A coil 50 are serially connected with each other between the tracking A input terminal 54 and the tracking A output terminal part 55 as described above, and the tracking C coil 62*a* and the tracking D coil 62*b* of the printed board B coil 60 are serially connected with each other between the tracking B input terminal part 64 and the tracking B output terminal part 65. Therefore, the four tracking coils 52*a*, 52*b*, 62*a*, and 62*b* are serially connected between the tracking input terminal 72 and the tracking output terminal 78.

The outer circumferential B wire 94, which is connected to the focus input terminal 92, is connected with the focus A input connecting part 93 via the B coupling member 95, and the focus A input connecting part 93 is soldered to the focus A input terminal part 56 of the printed board A coil 50. The focus A output terminal part 57 of the printed board A coil 50 is soldered to the focus A output connecting part 101 of the lens holder 30, and the focus B input connecting part 99 of the lens holder 30, which is connected with the tracking A output connecting part 101 via the D coupling member 100, is soldered to the focus B input terminal part 66 of the printed board B coil 60. The inner circumferential B wire 104, which is connected with the focus output terminal 102, is connected with the focus B output connecting part 103, and the focus B output connecting part 103 is soldered to the focus B output terminal part 67 of the printed board B coil 60.

The focus A coil 53 of the printed board A coil 50 is connected between the focus A input terminal part 56 and the focus A output terminal part 57 as described above, and focus B coil 63 of the printed board B coil 60 is connected between the focus B input terminal part 66 and the focus B output terminal part 67. Therefore, the focus A coil 53 and focus B coil 63 are serially connected with each other between the focus input terminal 92 and the focus output terminal 102. The aforementioned step is the third step of the production method.

In the actuator section 140 used in the pick-up device 200 according to the example of the present invention, the four wire-form elastic members 74, 80, 94, and 104 are integrally molded with the lens holder 30 and the actuator base 40, and the coupling portions for connecting the printed board A coil 50 with the printed board B coil 60 are integrally molded therewith as described above. Thus, there is no need to externally connect them using wiring members. Therefore, the production step is simplified, and the highly reliable actuator section 140 can be obtained.

Figure 17A:
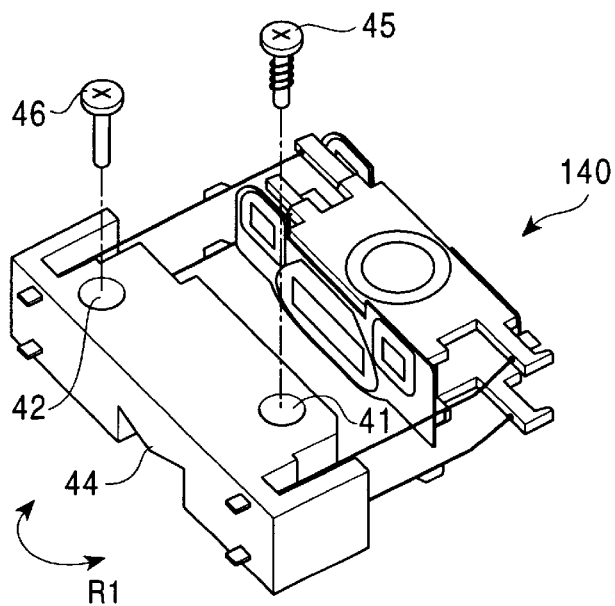
FIGS. 17A–17C are diagrams illustrating a procedure of incorporating the actuator section into the suspension base.

Next, a procedure of incorporating the actuator section 140 into the suspension base 150 will be described with reference to FIGS. 17A to 17C. FIG. 17A is a perspective view illustrating the actuator section 140, FIG. 17B is a perspective view illustrating a stopper member 157, and FIG. 17C is a perspective view illustrating the suspension base 150.

The V-shaped groove 44 of the actuator base 40 is mounted on the two M-shaped protruding plates 155 of the suspension base 150 as described above, and the actuator section 140 is fixed after a positional alignment operation is performed by using a screw with a spring 45 and a fixing screw 46. Thus, the movable portion 130 is movably supported while forming a predetermined magnetic space with respect to the pair of magnets 151. Thereafter, the stopper member 157 is inserted into insertion holes 154 of the pair of standing portions 153 which are provided in the suspension base 150 so as to surround the movable portion 130.

Figure 17B:
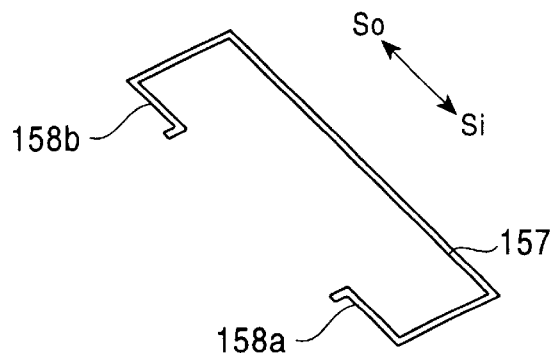
Figure 17C:
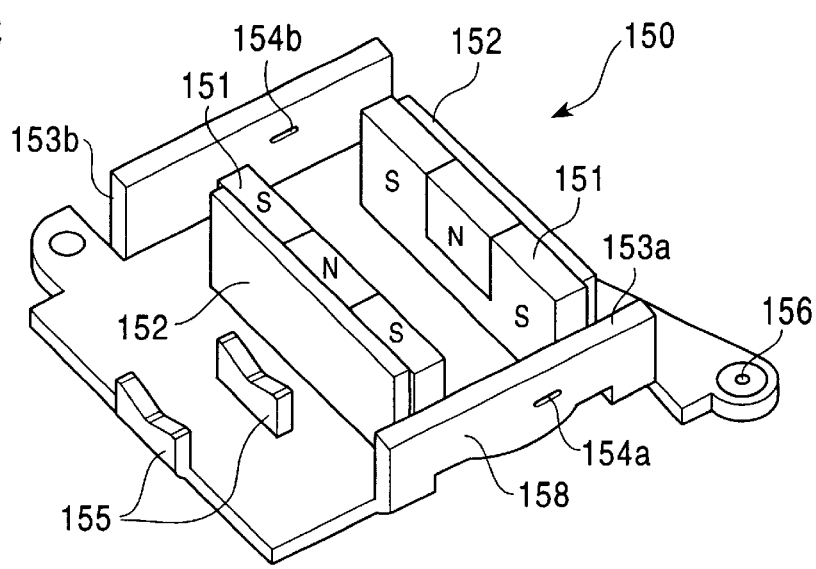

The stopper member 157 is a wire-form member which is folded so as to have a generally "]" shape as shown in FIG. 17B. Restraining portions 158*a* and 158*b* which protrude toward the inside of the standing portions 153, i.e., toward the movable portion 130, are provided at the ends of the "]" shape. When the stopper member 157 is inserted into the insertion holes 154 of the standing portions 153, the ends of the restraining portions 158*a* and 158*b* are inserted from the outer side of the standing portions 153. Thus, the stopper member 157 is made of an elastic member having a spring effect.

In the actuator section 140 which is mounted on the suspension base 150, the pair of standing portions 153 which are provided so as to surround the movable portion 130 regulate a moving range of the movable portion 130 in a tracking direction, and the stopper member 157 regulates a moving range of the movable portion 130 in a focus direction.

Figure 18A:
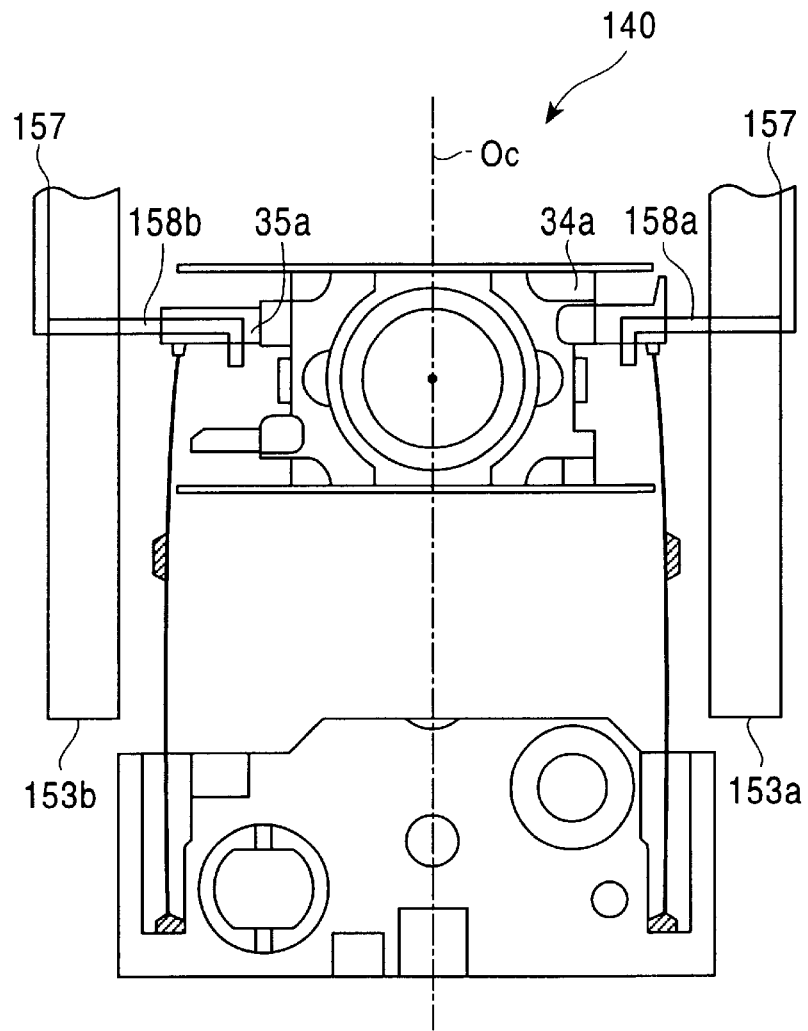
FIG. 18A and FIG. 18B are diagrams used for illustrating a function of a stopper member.

The detail will be described with reference to FIGS. 18A and 18B. FIG. 18A is a plan view illustrating the positional relationship among the actuator section 140, the standing portions 153 of the suspension base 150, and the stopper member 157, and FIG. 18B is a side view illustrating the positional relationship among the lens holder 30 including the objective lens 37, the standing portions 153, and the stopper member 157.

Figure 18B:
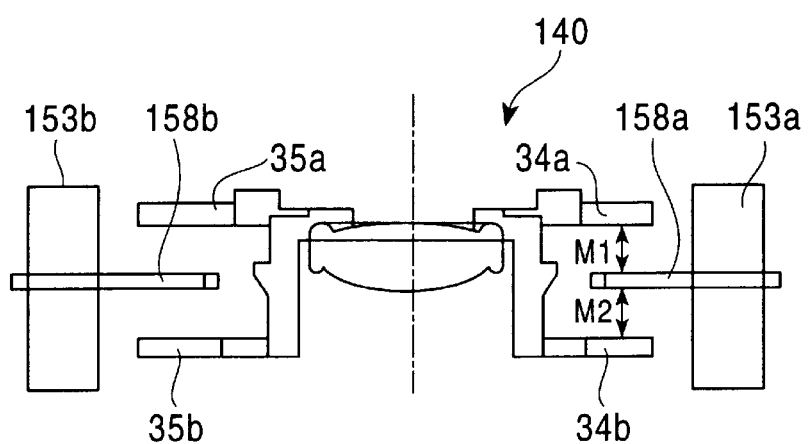
Figure 19:
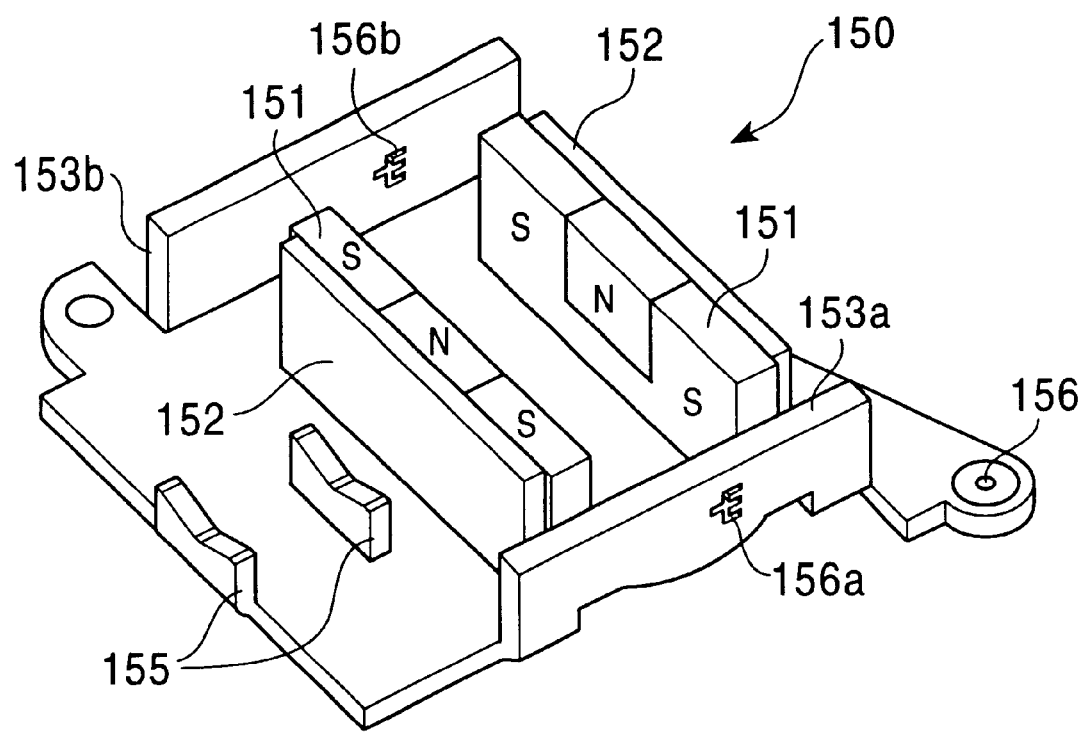
FIG. 19 is a diagram illustrating a stopper member according to another example.

As shown in FIGS. 18A and 18B, when the stopper member 157 is inserted into the insertion holes 154 of the standing portions 153, one restraining portion 158*a* of the stopper member 157 is positioned at an approximately center between the fixed arms 34*a* and 34*b* which are formed in the lens holder 30 so as to be apart from each other in a focus direction, and the other restraining portion 158*b* of the stopper member 157 is positioned at an approximately center between the fixed arms 35*a* and 35*b* which are formed in the lens holder 30 so as to be apart from each other in a focus direction. Therefore, if the movable portion 130 is driven in the upward focus direction, the moving range is limited to a distance M2 between the left and right fixed arms 34*b* and 35*b* formed at the side of the bottom surface 33 of the lens holder 30 and the restraining portions 158*a* and 158*b*. If the movable portion 130 is driven in the downward focus direction, the moving range is limited to a distance M1 between the right and left fixed arms 34*a* and 35*a* formed at the side of the top surface 31 of the lens holder 30 and the restraining portions 158*a* and 158*b*. Since the fixed arms 35*a* and 35*b*, which are fixed portions of the elastic member, are utilized as a mechanism for regulating the moving ranges in the focus directions as described above, a cost reduction is realized.

As the insertion holes 154 formed in the standing portions 153, a pair of insertion holes 156a and 156b in which a plurality of insertion positions are respectively formed may be provided. With such a structure, it becomes possible to define the upward moving range and the downward moving range of the movable portion 130 differently, thereby increasing the general applicability of the suspension base 150.

As described above, after the actuator section 140 is fixed to the suspension base 150, the stopper member 157 is inserted into the insertion holes 154 of the standing portions 153. Thereafter, the suspension base 150 is fixed to the pick-up body 170, thereby completing the pick-up device 200 according to the example of the present invention.

As described above, in the movable portion 130 forming a part of the pick-up device 200 according to the example of the present invention, the moving ranges thereof in the tracking directions are regulated by the standing portions 153 of the suspension base 150, and the moving ranges thereof in the focus directions are regulated by the stopper member 157. Therefore, the pick-up device 200 according to the example of the present invention requires no actuator cover, thereby making it possible to realize a small sized and light weighted pick-up device.

Figure 20:
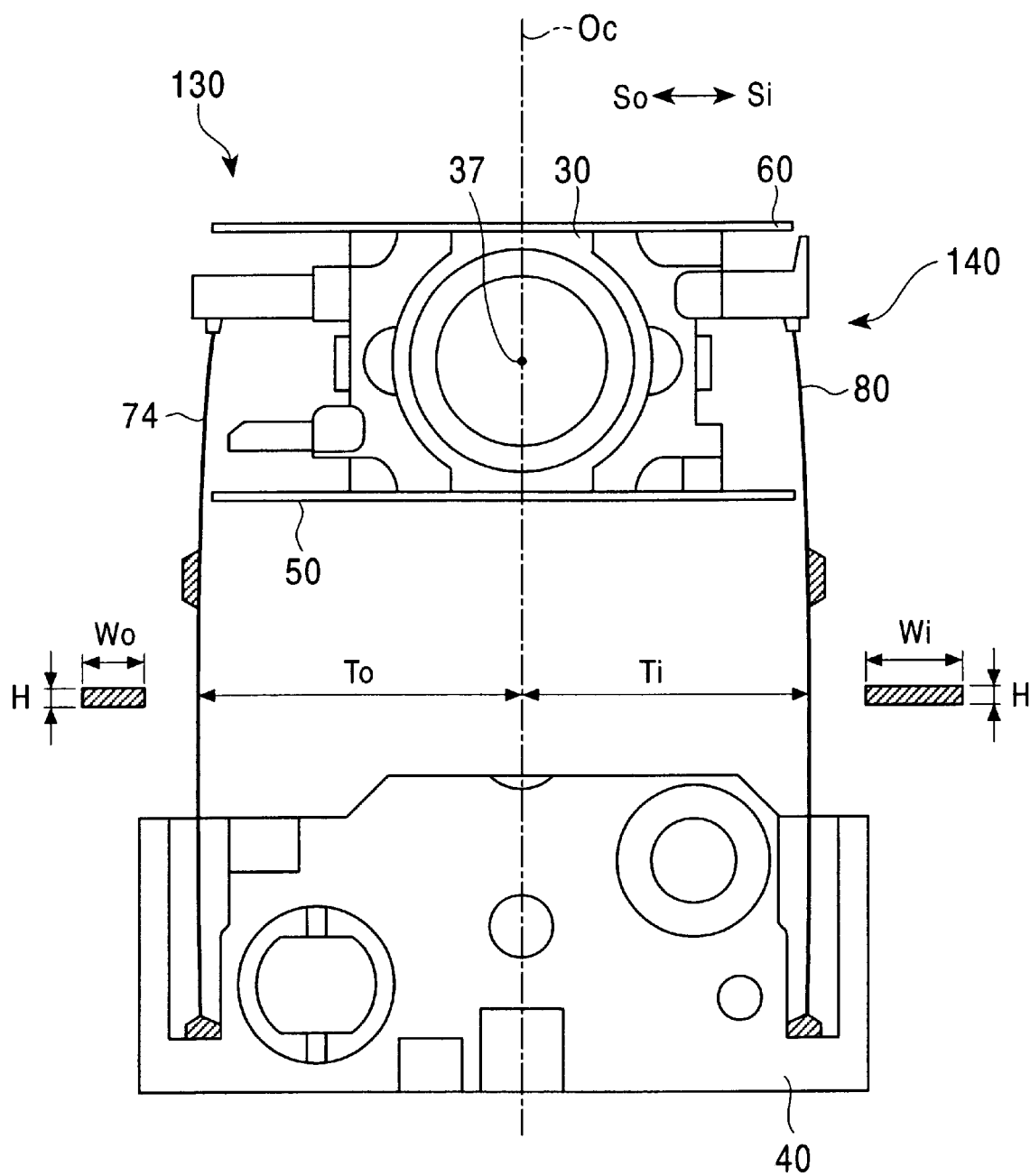
FIG. 20 is a diagram used for illustrating suppression of a rotation moment.
Figure 21:
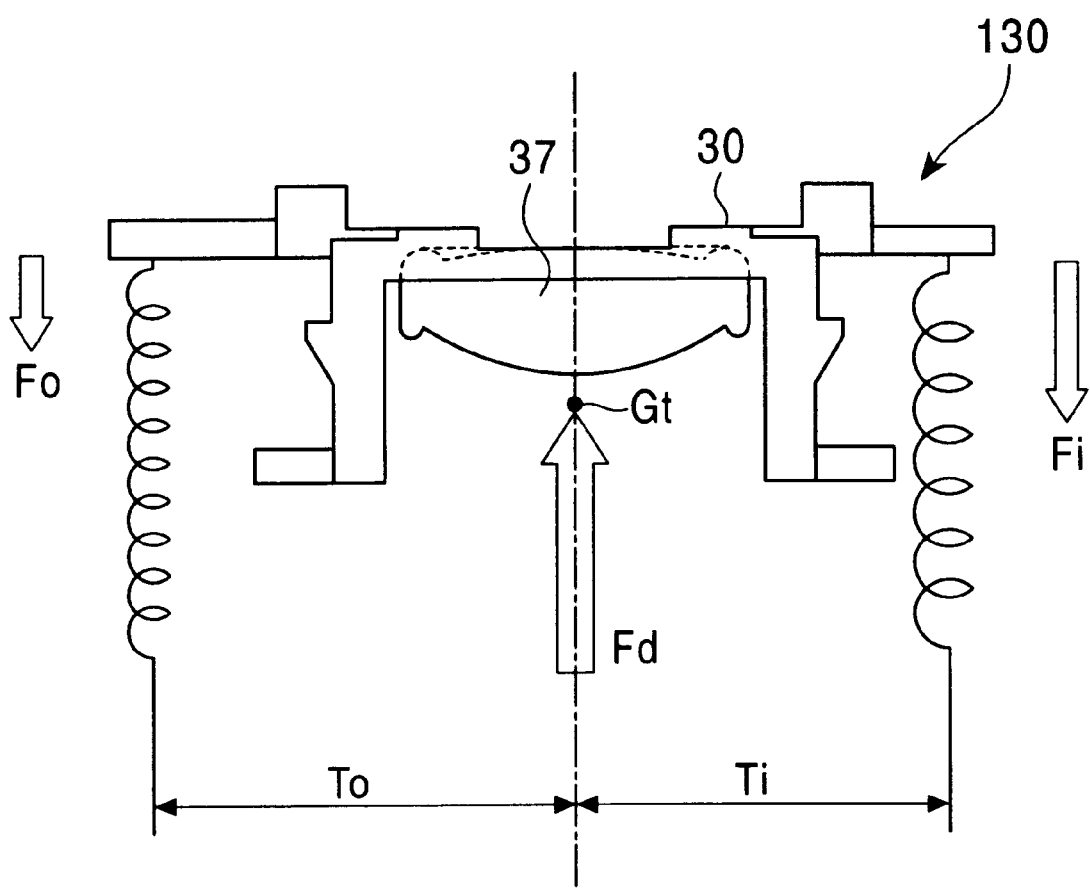
FIG. 21 is a diagram used for illustrating the suppression of a rotation moment.

Next, the configuration of the four wire-form elastic members 74, 94, 80, and 104 supporting the movable portion 130 and the function of preventing the movable portion 130 from rolling will be described with reference to FIG. 20 and FIG. 21. Although the movable portion 130 is actually supported by the four wire-form elastic members 74, 94, 80, and 104, these figures show only the outer circumferential A wire 74 and the inner circumferential A wire 80 in order to avoid the complicated explanation. This does not cause any difference in the operation. FIG. 20 is a plan view illustrating the actuator section 140, and FIG. 21 is a schematic diagram for illustrating a rotation moment of the movable portion 130.

In the pick-up device 200 according to the example of the present invention, as shown in FIG. 20, the distance Ti from the inner circumferential A wire 80 supporting the movable portion 130 to the optical central line Oc of the objective lens 37 is set to be smaller than the distance To from the outer circumferential A wire 74 to the optical central line Oc of the objective lens 37 as described above. Accordingly, although the inner circumferential A wire 80 and the outer circumferential A wire 74 are formed so as to have the same thickness H, the width Wi of the inner circumferential A wire 80 is set to be larger than the width Wo of the outer circumferential A wire 74 (Wi>Wo).

Thus, a spring constant Ki when the inner circumferential A wire 80 is deflected in a focus direction is represented by the following expression (1).

$$Ki\ Ti^3H \qquad (1)$$

Similarly, a spring constant Ko of the outer circumferential A wire 74 is represented by the following expression (2).

$$Ko\ To^3H \qquad (2)$$

Thus, due to the aforementioned relationship of Wi>Wo, the spring constant Ki of the inner circumferential A wire 80 is greater than the spring constant Ko of the outer circumferential A wire 74.

If a deflection amount of each of the inner circumferential A wire 80 and the outer circumferential A wire 74 in a focus direction when the movable portion 130 is displaced in a focus direction by a driving force Fd is represented by x, a restoring force Fi of the inner circumferential A wire 80 when the movable portion 130 is displaced in a focus direction as shown in FIG. 21 is represented by the following expression (3).

$$Fi=Kix \qquad (3)$$

Similarly, a restoring force Fo of the outer circumferential A wire 74 is represented by the following expression (4).

$$Fo=Kox \qquad (4)$$

Due to the aforementioned relationship of Ki>Ko, the restoring force Fi of the inner circumferential A wire 80 is greater than the restoring force Fo of the outer circumferential A wire 74 (Fi>Fo).

The rotation moment of the movable portion 130 is obtained by multiplying distances between the center of gravity Gt of the movable portion 130 (the point of application of the focus driving force coincides with the center of gravity of the movable portion 130 on the optical axis La) and the springs (the inner circumferential A wire 80 and the outer circumferential A wire 74) by the restoring forces at the positions where the springs (the inner circumferential A wire 80 and the outer circumferential A wire 74) are fixed. Therefore, if the rotation moment of the restoring force Fi of the inner circumferential A wire 80 and the rotation moment of the restoring force Fo of the outer circumferential A wire 74 are in equilibrium, the rotation moment becomes 0. Therefore, the movable portion 130 is not rotated.

Thus, the width Wi of the inner circumferential A wire 80 and the width Wo of the outer circumferential A wire 74 are set so as to satisfy a relationship represented by the following expression (5).

$$FiTi=FoTo \qquad (5)$$

As described above, in the pick-up device 200 according to the example of the present invention, the distance Ti from the inner circumferential wires 80 and 104 supporting the movable portion 130 to the optical central line Oc of the objective lens 37 is set to be smaller than the distance To from the outer circumferential wires 74 and 94 to the optical central line Oc of the objective lens 37, and the width Wi of each of the inner circumferential wires 80 and 104 is set to be larger than the width Wo of each of the outer circumferential wires 74 and 94. Consequently, without causing rolling of the movable portion 130 due to the rotation moment, it becomes possible to configure the inner circumferential side of the actuator section 140, i.e., the side closer to the spindle motor 180, to be smaller than the outer circumferential side thereof, and to allow the objective lens to be closer to the inner circumferential side of the optical disk.

Figure 22:
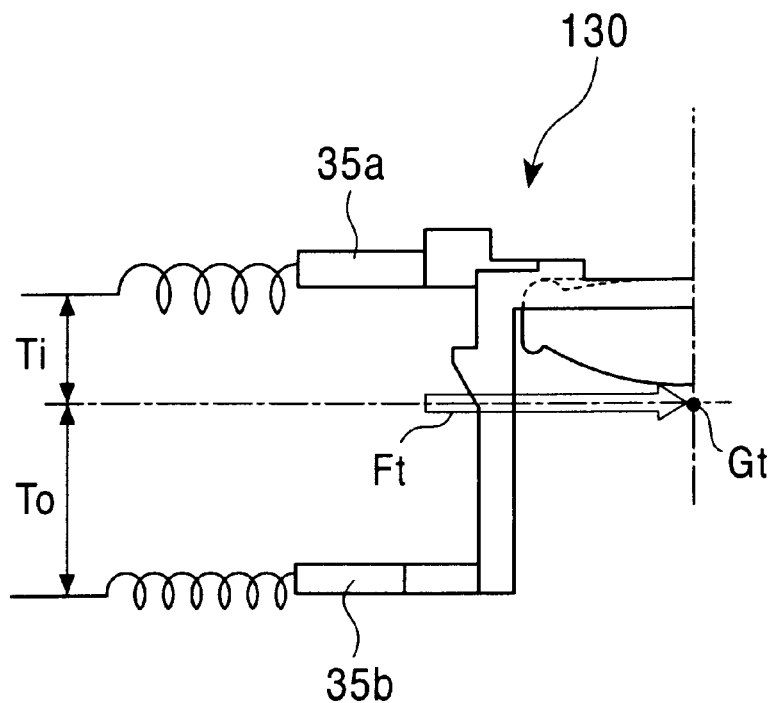
FIG. 22 is a diagram used for illustrating the suppression of a rotation moment.

Although the spring constants of the wire-form elastic members 74, 94, 80, and 104 are set to be differed between the inner circumferential side members and the outer circumferential side members in the above example, it is possible to set the spring constants to be differed between the wire-form elastic members 74 and 80 at the upward focus direction side and the wire-form elastic members 94 and 104 at the downward focus direction side. More specifically, as shown in FIG. 22, in order to suppress the generation of rotation moments due to the restoring forces of the springs in the case where the distance Ti between the center of gravity Gt of the movable portion 130 and the upper side wire-form elastic members 74 and 80 is different from the distance To between the center of gravity Gt of the movable portion 130 and the lower side wire-form elastic members 94 and 104 and the center of gravity Gt is driven in a tracking direction by a driving force Ft, the spring constant when the upper side wire-form elastic members 74 and 80 are deflected in a tracking direction and the spring constant when the lower side wire-form elastic members 94 and 104 are deflected in a tracking direction are suitably set so as to satisfy the above-described expression (4).

The setting of the spring constants does not always need to satisfy the above-described expression (4). As long as the spring constants are set differently so as to have a reduced rotation moment applied to the movable portion as compared to the case where the spring constants are the same, such a setting can contribute to the suppression of the rolling of the movable portion.

Figure 23:
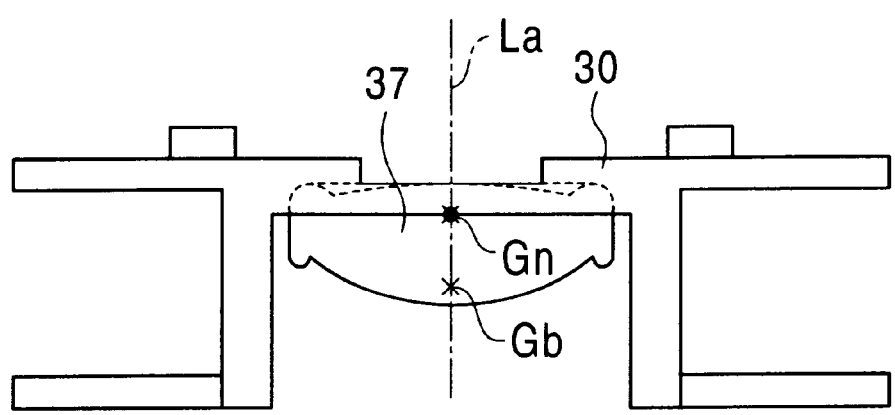
FIG. 23 is a diagram used for illustrating a relationship between a printed board coil and a counter weight.
Figure 24:
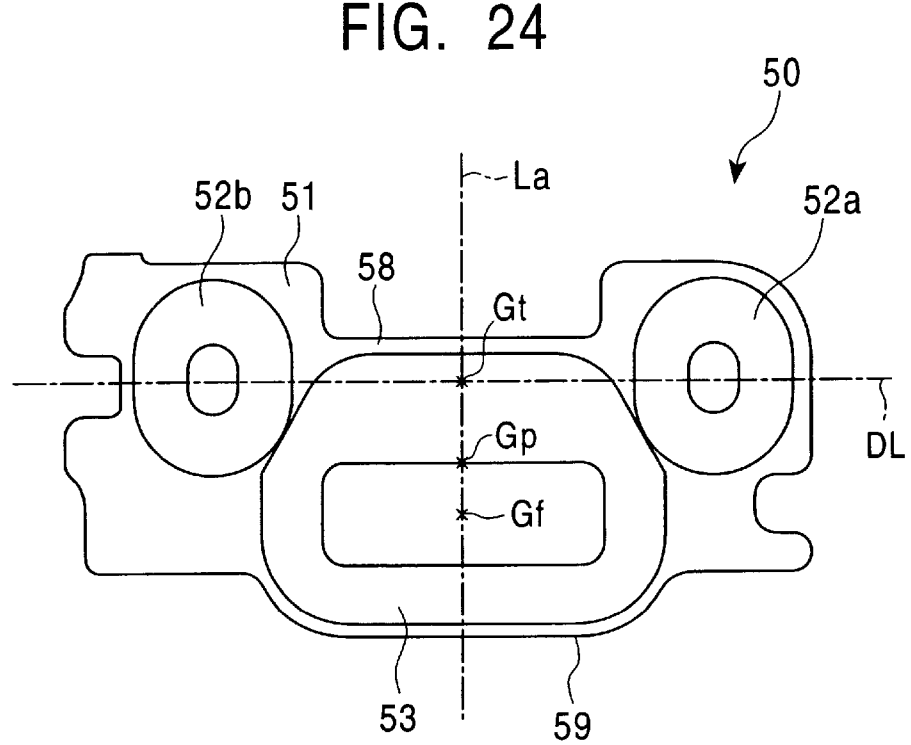
FIG. 24 is a diagram used for illustrating a relationship between a printed board coil and a counter weight.
Figure 25:
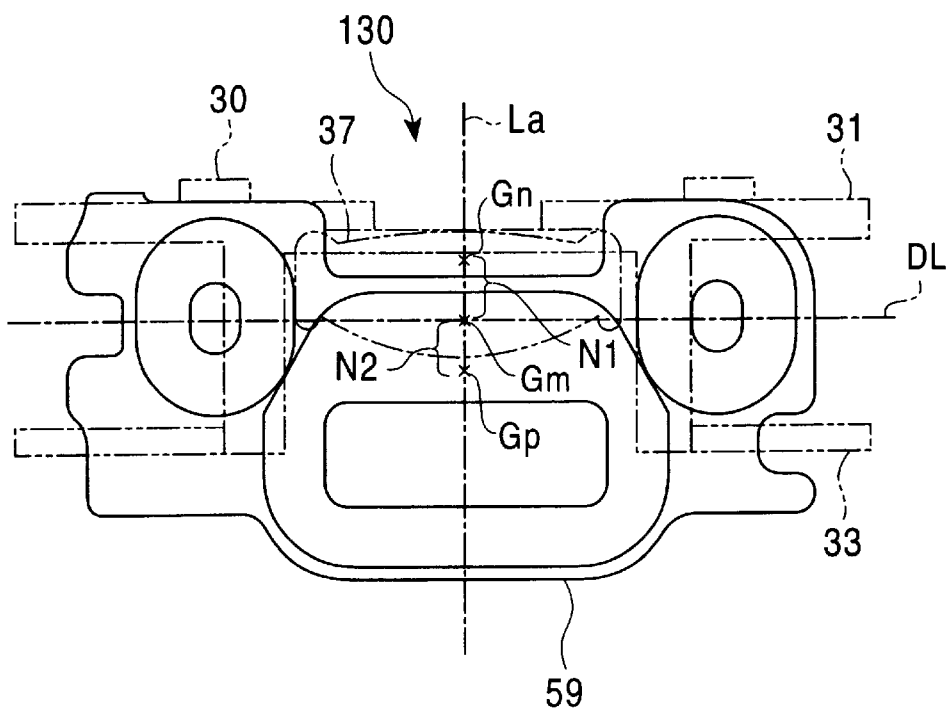
FIG. 25 is a diagram used for illustrating a relationship between a printed board coil and a counter weight.
Figure 26:
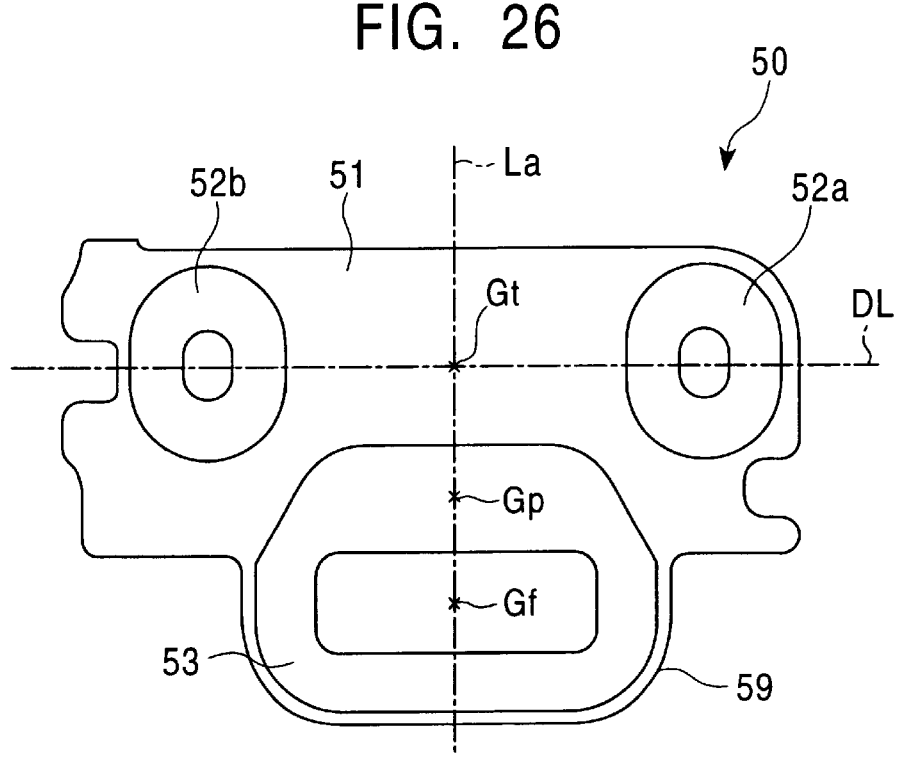
FIG. 26 is a diagram illustrating another form of a printed board coil.

Next, the center of gravity of the movable portion 130 will be described with reference to FIGS. 23 to 26. Although the printed board A coil 50 and the printed board B coil 60 are fixed to the movable portion 130 in reality, since the substrates 51 and 61 of the printed board A coil 50 and the printed board B coil 60 are formed so as to have the same shape, they have the same position of the center of gravity. Therefore, in each of FIG. 23 and FIG. 26, only the printed board A coil 50 is shown in order to avoid the complicated description. FIG. 23 is a diagram illustrating the center of gravity of the lens holder 30 when the objective lens 37 is contained therein, and FIG. 24 is a diagram illustrating the center of gravity of the printed board A coil 50. FIG. 25 is a diagram illustrating the center of gravity of the movable portion 130, and FIG. 26 shows an example in which the focus A coil 53 is provided further below.

Since the lens holder 30 is a resin-molded member having a generally rectangular shape and a hollow structure and it includes the top surface 31 as described above, the center of gravity of the lens holder 30 is positioned, as shown in FIG. 23, at Gb in the figure which is closer to the top surface 31 than the center of the lens holder 30. If the objective lens 37 is contained in this lens holder 30, the center of gravity of the lens holder 30 moves to a position indicated by Gn in the figure which is further closer to the top surface 31.

The printed board A coil 50 includes the notch portion 58 having a concave shape which is formed in an upper portion of the substrate 51 and the convex portion 59 which is formed at a bottom portion of the substrate 51 between the tracking A coil 52a and the tracking B coil 52b. The printed board A coil 50 includes the tracking A coil 52a and the tracking B coil 52b which are provided symmetrically with respect to the optical axis La. Therefore, the center of gravity of the tracking A coil 52a and the tracking B coil 52b is positioned at an intersection (represented by Gt in FIG. 24) between the line of action DL of a tracking driving force, which connects the centers of the two tracking coils 52a and 52b with each other, and the optical axis La. The center of gravity of the focus A coil 53 is positioned at a point indicated by Gf in the figure, which is the center of the focus A coil 53 and intersects with the optical axis La. Accordingly, the center of gravity of the printed board A coil 50 is positioned at a point indicated by Gp in the figure, which is located below the center of gravity Gt of the two tracking coils 52a and 52b and which is located above the center of gravity Gf of the focus A coil 53.

FIG. 25 shows a state in which the printed board A coil 50 is fixed to the lens holder 30. If the printed board A coil 50 is fixed at a position where the top surface 31 of the lens holder 30 and the top surface of the substrate 51 forms a straight line, the convex portion 59 of the printed board A coil 50 is fixed with being protruded below the bottom surface 33 of the lens holder 30.

If a distance N1 between the center of gravity Gn of the lens holder 30 containing the objective lens 37 and the line of action DL of the tracking driving force is equal to a distance N2 between the center of gravity Gp of the printed board A coil 50 and the line of action DL of the tracking driving force while the printed board A coil 50 is fixed to the lens holder 30 containing the objective lens 37, a center of gravity Gm of the movable portion 130 is formed on the optical axis La of the objective lens 37 and also on the line of action DL of the tracking driving force.

Therefore, in the printed board A coil 50, the dimension of the notch portion 58 and the dimension of the convex portion 59 are set when designing the substrate 51 so that the distance N1 between the center of gravity Gn of the lens holder 30 containing the objective lens 37 and the line connecting the centers of the tracking coils 52a and 52b, i.e., the line of action DL of the tracking driving force is equal to the distance N2 between the center of gravity Gp of the printed board A coil 50 and the line of action DL. Accordingly, the center of gravity of the movable portion 130 can be set at the intersection between the line of action DL of the tracking driving force and the optical axis La, and thus a rotation moment is not generated when the movable portion 130 is driven in a tracking direction. As described above, since the weight of the focus A coil 53 can be used as a counter weight in the present example, as compared to the case where a dedicated counter weight is used, it is possible to avoid an adverse effect due to a rotation moment without increasing the weight of the movable portion 130.

The notch portion 58, which is formed at an upper portion of the substrate 51, can lighten the center of gravity of the printed board A coil 50, and increase the distance between the line of action DL of the two tracking coils 52a and 52b and the center of gravity Gp of the printed board A coil 50, i.e., N2. As a result, the weight effect as a counter weight is increased. More specifically, by providing the notch portion 58 in the substrate 51, the weight as a counter weight can be substantially increased without increasing the total weight of the movable portion 130. Thus, the freedom with respect to the weight of the objective lens 37 is increased, thereby improving the general applicability.

The printed board A coil 50 may be configured so that the focus A coil 53 is positioned further below as shown in FIG. 26. With such a structure, since the center of gravity Gf of the focus A coil 53 is positioned lower than that illustrated in FIG. 24, the center of gravity Gp of the printed board A coil 50 is also moved downwardly. With such a structure, however, the weight of the substrate 51 is increased as compared to the example illustrated in FIG. 24, and the convex portion 59 of the substrate 51 is also increased, thereby limiting the moving range of the movable portion 130 in the downward focus direction. Therefore, the shape of the printed board A coil 50 is set in accordance with the position of the center of gravity of the lens holder 30 containing the objective lens 37.

Figure 27:
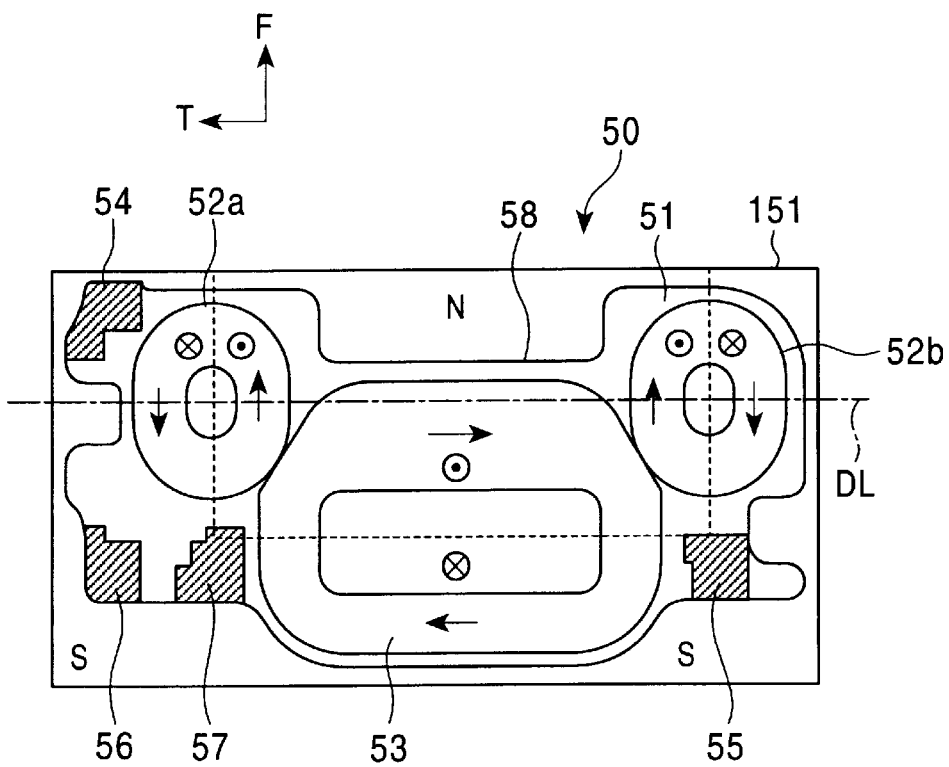
FIG. 27 is a diagram used for illustrating focus and tracking driving forces.

Next, the operation of the movable portion of the pick-up device 200 according to the example of the present invention will be described with reference to FIG. 27. FIG. 27 is a diagram illustrating a relative positional relationship between the printed board A coil 50 and the magnet 151 when the movable portion 130 is at a regular position.

The magnet 151 is a multi-polarized magnet in which an N pole having a generally rectangular shape is provided at a center thereof and an S pole having a generally U shape is provided so as to surround the N pole from the three sides, for example. The N-polarized region generates a magnetic flux normal to the paper of the figure which is oriented in a direction from the reverse side to the front side of the figure, and the S-polarized region generates a magnetic flux normal to the paper of the figure which is oriented in a direction from the front side to the reverse side of the figure. As shown in FIG. 27, the center of each coil formed in the printed board A coil 50 is positioned on the boundary between the N pole and the S pole of the magnet 151.

When a current in a direction indicated by an arrow in the figure flows through the tracking A coil 52*a* and the tracking B coil 52*b* by supplying a tracking driving current between the tracking A input terminal part 54 and the tracking A output terminal part 55, a tracking driving force in the left direction indicated by an arrow T in the figure is generated. If a driving current in the opposite direction is supplied, a tracking driving force in the right direction which is opposite to the direction indicated by the arrow T in the figure is generated.

When a current in a direction indicated by an arrow in the figure flows through the focus A coil 53 by supplying a focus driving current to the focus A input terminal part 56 and the focus A output terminal part 57, a focus driving force in the upward direction indicated by an arrow F in the figure is generated. Similarly, if a driving current in the opposite direction is supplied thereto, a focus driving force in the downward direction which is opposite to the direction indicated by the arrow F in the figure is generated.

According to the present invention, it is possible to provide a lens driving apparatus which can accurately drive an actuator and which has a good space factor since it is possible to configure one side separated by an optical axis to be smaller than the other side without generating a rotation moment.

What is claimed is:

1. A lens driving apparatus for a disk player for driving a lens holder in focus and tracking directions, said apparatus comprising said lens holder including an objective lens, focus coils, and tracking coils fixed thereto which is supported by a plurality of cantilevered wire-form elastic members, wherein:

said wire-form elastic members include inner circumferential side wire-form elastic members and outer circumferential side wire-form elastic members which are disposed to be apart from each other in said tracking direction so that a focus driving force generated by said focus coils is applied between each of said inner circumferential side wire-form elastic members and a corresponding one of said outer circumferential side wire-form elastic members; and each of said inner circumferential side wire-form elastic members has a distance to said objective lens in said tracking direction that is different from a distance of corresponding one of said outer circumferential side wire-form elastic members to said objective lens in said tracking direction and, spring constants in said focus direction of ones of said inner and outer circumferential side wire-form elastic members which are closer to said objective lens than others are larger than spring constants in said focus direction of the others of said inner and outer circumferential side wire-form elastic members, respectively.

2. The lens driving apparatus for a disk player according to claim 1, wherein said spring constant of said inner circumferential side wire-form elastic members is greater than said spring constant of said outer circumferential side wire-form elastic members, and said distance from said inner circumferential side wire-form elastic to said objective lens is smaller than said distance from said outer circumferential side-form elastic members to said objective lens.

3. The lens driving apparatus for a disk player according to claim 1, wherein said spring constants of said inner circumferential side wire-form elastic members and said outer circumferential side wire-form elastic members, and said distances to said objective lens have a relationship of FiTi=FoTo, wherein: F1 is said spring constant of said inner circumferential side wire-form elastic members; Ti is said distance from said inner circumferential side wire-form elastic members to said objective lens; Fo is said spring constant of said outer circumferential side wire-form elastic members; and To is said distance from said outer circumferential side wire-form elastic members to said objective lens.

4. The lens driving apparatus for a disk player according to claim 1, wherein said inner circumferential side wire-form elastic members and said outer circumferential side wire-form elastic members are formed by plate springs having the same thickness in said focus direction, and a width of each of said inner circumferential side wire-form elastic members in said tracking direction is greater than a width of each of said outer circumferential side wire-form elastic members in said tracking direction.

* * * * *